(12) United States Patent
Rempell et al.

(10) Patent No.: US 9,471,287 B2
(45) Date of Patent: *Oct. 18, 2016

(54) SYSTEMS AND METHODS FOR INTEGRATING WIDGETS ON MOBILE DEVICES

(71) Applicant: Express Mobile, Inc., Novato, CA (US)

(72) Inventors: Steven H. Rempell, Novato, CA (US); David Chrobak, Clayton, CA (US); Ken Brown, San Martin, CA (US)

(73) Assignee: Express Mobile, Inc., Novato, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/708,074

(22) Filed: May 8, 2015

(65) Prior Publication Data

US 2015/0317130 A1 Nov. 5, 2015

Related U.S. Application Data

(63) Continuation of application No. 12/936,395, filed as application No. PCT/US2009/039695 on Apr. 6, 2009, now Pat. No. 9,063,755.

(60) Provisional application No. 61/123,438, filed on Apr. 7, 2008, provisional application No. 61/113,471, filed on Nov. 11, 2008, provisional application No. 61/166,651, filed on Apr. 3, 2009.

(51) Int. Cl.
| | |
|---|---|
| *G06F 3/048* | (2013.01) |
| *G06F 9/44* | (2006.01) |
| *H04L 29/08* | (2006.01) |
| *G06F 3/0484* | (2013.01) |
| *G06F 3/0482* | (2013.01) |
| *H04L 29/06* | (2006.01) |
| *H04L 12/58* | (2006.01) |

(52) U.S. Cl.
CPC .............. *G06F 8/34* (2013.01); *G06F 3/0482* (2013.01); *G06F 3/04842* (2013.01); *G06F 9/4443* (2013.01); *H04L 51/046* (2013.01); *H04L 65/60* (2013.01); *H04L 67/02* (2013.01)

(58) Field of Classification Search
CPC ....................................................... G06F 3/048
See application file for complete search history.

(56) References Cited

U.S. PATENT DOCUMENTS

| | | | |
|---|---|---|---|
| 2004/0055017 A1 | 3/2004 | Delpuch et al. | |
| 2004/0163020 A1 | 8/2004 | Sidman | |
| 2004/0199614 A1* | 10/2004 | Shenfield ................ | H04L 29/06 709/220 |

(Continued)

OTHER PUBLICATIONS

Stina Nylander et al. "The Ubiquitous Interactor—Device Independent Access to Mobile Services" (Computer-Aided Design for User Interfaces IV, Proceedings of the Fifth International Conference on Computer-Aided Design of User Interfaces CADUI'2004, Jan. 2004, pp. 271-282).*

(Continued)

*Primary Examiner* — Jennifer To
*Assistant Examiner* — Xuyang Xia
(74) *Attorney, Agent, or Firm* — Steven R. Vosen

(57) ABSTRACT

Embodiments of a system and method are described for generating and distributing programming to mobile devices over a network. Devices are provided with Players specific to each device and Applications that are device independent. Embodiments include a full-featured WYSIWYG authoring environment, including the ability to bind web components to objects.

28 Claims, 18 Drawing Sheets

(56) References Cited

U.S. PATENT DOCUMENTS

2005/0149935 A1    7/2005   Benedetti
2005/0273705 A1*  12/2005   McCain ................. G06F 17/24
                                                        715/234
2006/0063518 A1    3/2006   Paddon et al.

OTHER PUBLICATIONS

Stina Nylander et at. "The Ubiquitous Interactor—Device Independent Access to Mobile Services" (Computer-Aided Design for User Interfaces IV, Proceedings of the Fifth international Conference on Computer-Aided Design of User Interfaces CADUT2004, Jan. 2004, pp. 271-282).

International Search Report and Written Opinion —PCT/US2009/039695—Aug. 21, 2009.
International Preliminary Report on Patentability and Written Opinion—PCT/US2009/039695—Oct. 21, 2010.
Rempell et al, co-pending U.S. Appl. No. 14/708,087, filed May 8, 2015.
Rempell et al, co-pending U.S. Appl. No. 14/708,094, filed May 8, 2015.
Rempell et al, co-pending U.S. Appl. No. 14/708,097, filed May 8, 2015.
Rempell et al, co-pending U.S. Appl. No. 14/708,100, filed May 8, 2015.
Rempell et al, co-pending U.S. Appl. No. 14/708,108, filed May 8, 2015.

* cited by examiner

SYSTEMS AND METHODS FOR INTEGRATING WIDGETS ON MOBILE DEVICES

TECHNICAL FIELD

The present invention generally relates to providing software for mobile devices, and more particularly to a method and system for authoring Applications for devices.

BACKGROUND ART

Internet-connected mobile devices are becoming ever more popular. While these devices provide portability to the Internet, they generally do not have the capabilities of non-mobile devices including computing, input and output capabilities.

In addition, the mobility of the user while using such devices provides challenges and opportunities for the use of the Internet. Further, unlike non-mobile devices, there are a large number of types of devices and they tend to have a shorter lifetime in the marketplace. The programming of the myriad of mobile devices is a time-consuming and expensive proposition, thus limiting the ability of service providers to update the capabilities of mobile devices.

Thus there is a need in the art for a method and apparatus that permits for the efficient programming of mobile devices. Such a method and apparatus should be easy to use and provide output for a variety of devices.

DISCLOSURE OF INVENTION

In certain embodiments, a system is provided to generate code to provide content on a display of a platform. The system includes a database of web services obtainable over a network and an authoring tool. The authoring tool is configured to define an object for presentation on the display, select a component of a web service included in said database, associate said object with said selected component, and produce code that, when executed on the platform, provides said selected component on the display of the platform.

In certain other embodiments, a method is provided for providing information to platforms on a network. The method includes accepting a first code over the network, where said first code is platform-dependent; providing a second code over the network, where said second code is platform-independent; and executing said first code and said second code on the platform to provide web components obtained over the network.

In certain embodiments, a method for displaying content on a platform utilizing a database of web services obtainable over a network is provided. The method includes: defining an object for presentation on the display; selecting a component of a web service included in said database; associating said object with said selected component; and producing code that, when executed on the platform, provides said selected component on the display of the platform.

In one embodiment, one of the codes is a Player, which is a thin client architecture that operates in a language that manages resources efficiently, is extensible, supports a robust application model, and has no device specific dependencies. In another embodiment, Player P is light weight and extends the operating system and/or virtual machine of the device to: Manage all applications and application upgrades, and resolve device, operating system, VM and language fragmentation.

In another embodiment, one of the codes is an Application that is a device independent code that interpreted by the Player.

These features together with the various ancillary provisions and features which will become apparent to those skilled in the art from the following detailed description, are attained by the system and method of the present invention, preferred embodiments thereof being shown with reference to the accompanying drawings, by way of example only, wherein:

Reference symbols are used in the Figures to indicate certain components, aspects or features shown therein, with reference symbols common to more than one Figure indicating like components, aspects or features shown therein.

MODE(S) FOR CARRYING OUT THE INVENTION

Figure 1A:
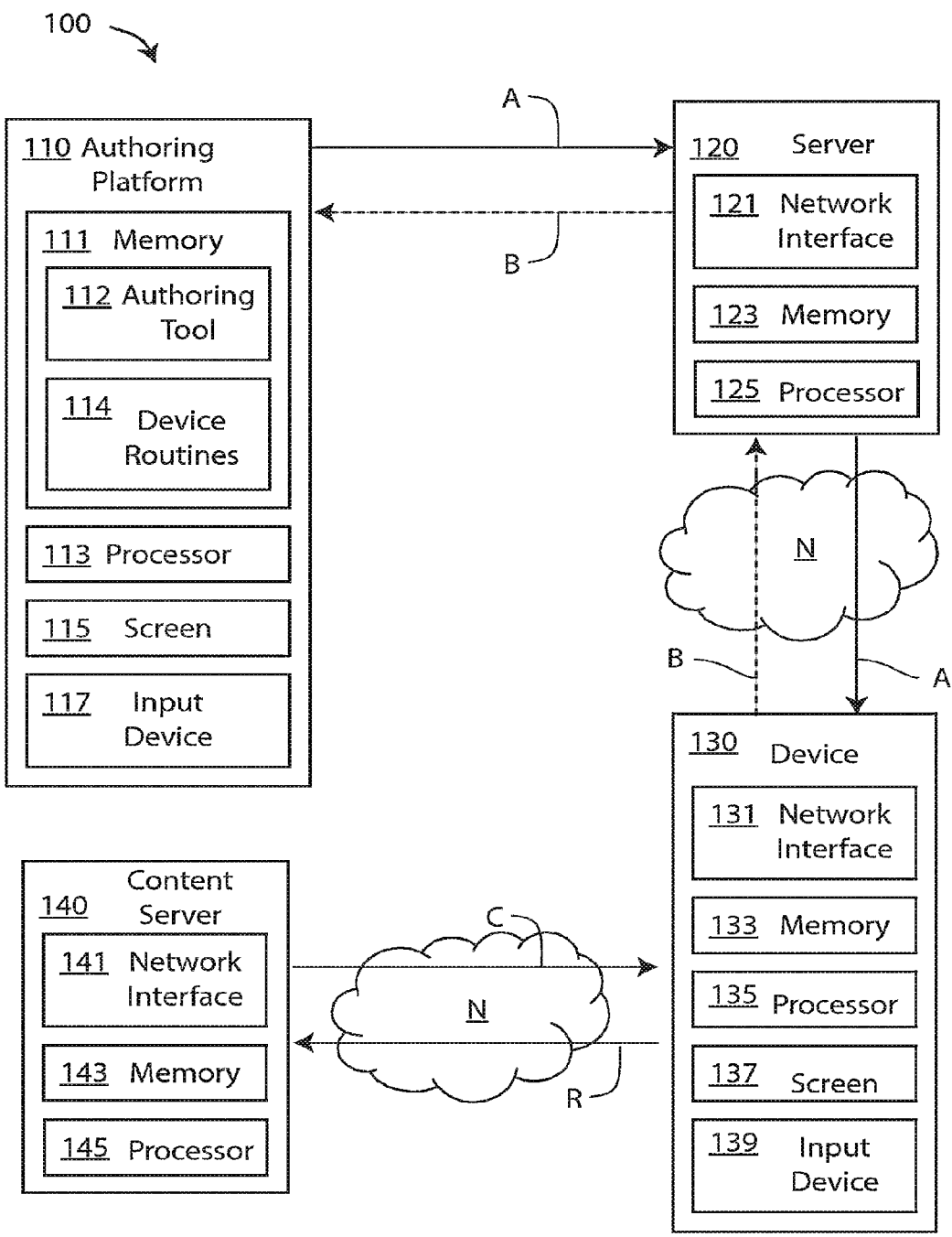
FIG. 1A is an illustrative schematic of one embodiment of a system including an authoring platform and a server for providing programming instructions to a device over a network.

FIG. 1A is an illustrative schematic of one embodiment of a system 100 including an authoring platform 110 and a server 120 for providing programming instructions to a device 130 over a network N. In one embodiment, device 130 is a wireless device, and network N includes wireless communication to the device. Alternatively, system 100 may provide access over network N to other information, data, or content, such as obtainable as a web service over the Internet. In general, a user of authoring platform 110 may produce programming instructions or files that may be transmitted over network N to operate device 130, including instructions or files that are sent to device 130 and/or server 120. The result of the authoring process is also referred to herein, and without limitation, as publishing an Application.

Embodiments include one or more databases that store information related to one or more devices 130 and/or the content provided to the devices. It is understood that such databases may reside on any computer or computer system on network N, and that, in particular, the location is not limited to any particular server, for example.

Device 130 may be, for example and without limitation, a cellular telephone or a portable digital assistant, includes a network interface 131, a memory 133, a processor 135, a screen 137, and an input device 139. Network interface 131 is used by device 130 to communication over a wireless network, such as a cellular telephone network, a WiFi network or a WiMax network, and then to other telephones through a public switched telephone network (PSTN) or to a satellite, or over the Internet. Memory 133 includes programming required to operate device 130 (such as an operating system or virtual machine instructions), and may include portions that store information or programming instructions obtained over network interface 131, or that are input by the user (such as telephone numbers or images from a device camera (not shown). In one embodiment screen 137 is a touch screen, providing the functions of the screen and input device 139.

Authoring platform 110 includes a computer or computer system having a memory 111, a processor 113, a screen 115, and an input device 117. It is to be understood that memory 111, processor 113, screen 115, and input device 117 are configured such a program stored in the memory may be executed by the processor to accept input from the input device and display information on the screen. Further, the program stored in memory 111 may also instruct authoring platform 110 to provide programming or information, as indicated by the line labeled "A" and to receive information, as indicated by the line labeled "B."

Memory 111 is shown schematically as including a stored program referred to herein, and without limitation, as an authoring tool 112. In one embodiment, authoring tool 112 is a graphical system for designing the layout of features as a display that is to appear on screen 137. One example of authoring tool 112 is the CDER™ publishing platform (Express Mobile, Inc., Novato, Calif.).

In another embodiment, which is not meant to limit the scope of the present invention, device 130 may include an operating system having a platform that can interpret certain routines. Memory 111 may optionally include programming referred to herein, and without limitation, as routines 114 that are executable on device 130.

Routines 114 may include device-specific routines—that is, codes that are specific to the operating system, programming language, or platform of specific devices 130, and may include, but are not limited to, Java, Windows Mobile, Brew, Symbian OS, or Open Handset Alliance (OHA). Several examples and embodiments herein are described with reference to the use of Java. It is to be understood that the invention is not so limited, except as provided in the claims, and that one skilled in the art could provide Players for devices using routines provided on a platform. Thus as an example, routines 114 may include Java API's and an authoring tool System Development Kit (SDK) for specific devices 130.

Server 120 is a computer or computer system that includes a network interface 121, a memory 123, and a processor 125. Is to be understood that network interface 121, memory 123, and processor 125 are configured such that a program stored in the memory may be executed by the processor to: accept input and/or provide output to authoring platform 110; accept input and/or provide output through network interface 121 over network N to network interface 131; or store information from authoring platform 110 or from device 130 for transmission to another device or system at a later time.

In one embodiment, authoring platform 110 permits a user to design desired displays for screen 137 and actions of device 130. In other words, authoring platform 110 is used to program the operation of device 130. In another embodiment, authoring platform 110 allows a user to provide input for the design of one or more device displays and may further allow the user to save the designs as device specific Applications. The Applications may be stored in memory 123 and may then be sent, when requested by device 130 or when the device is otherwise accessible, over network N, through network interface 130 for storage in memory 133.

In an alternative embodiment, analytics information from devices 130 may be returned from device 130, through network N and server 120, back to authoring platform 110, as indicated by line B, for later analysis. Analytics information includes, but is not limited to, user demographics, time of day, and location. The type of analytic content is only limited by which listeners have been activated for which objects and for which pages. Analytic content may include, but is not limited to, player-side page view, player-side forms-based content, player-side user interactions, and player-side object status.

Content server 140 is a computer or computer system that includes a network interface 141, a memory 143, and a processor 145. It is to be understood that network interface 141, memory 143, and processor 145 are configured such that a stored program in the memory may be executed by the processor to accepts requests R from device 130 and provide content C over a network, such as web server content the Internet, to device 130.

Figure 1B:
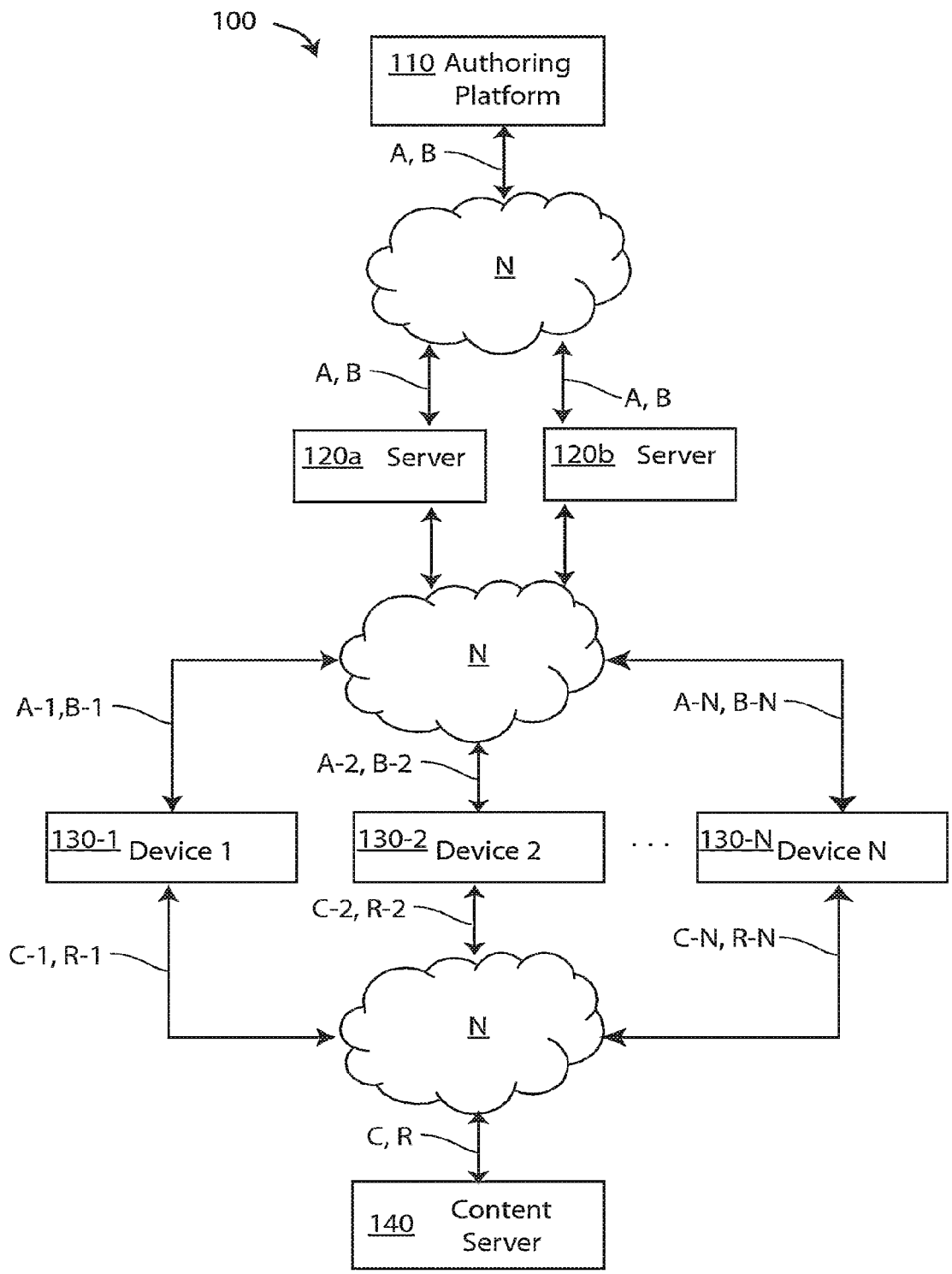
FIG. 1B is schematic of an alternative embodiment system for providing programming instructions to device over a network.

FIG. 1B is schematic of an alternative embodiment system 100 for providing programming instructions to device 130 over a network N that is generally similar to the system of FIG. 1A. The embodiment of FIG. 1B illustrates that system 100 may include multiple servers 120 and/or multiple devices 130.

In the embodiment of FIG. 1B, system 100 is shown as including two or more servers 120, shown illustratively and without limitation as servers 120*a* and 120*b*. Thus some of the programming or information between authoring platform 110 and one or more devices 130 may be stored, routed, updated, or controlled by more than one server 120. In particular, the systems and methods described herein may be executed on one or more server 120.

Also shown in FIG. 1B are a plurality of devices 130, shown illustratively and without limitation as device 130-1, 130-1, . . . 130-N. System 100 may thus direct communication between individual server(s) 120 and specific device(s) 130.

As described subsequently, individual devices 130 may be provided with program instructions which may be stored in each device's memory 133 and where the instructions are executed by each device's processor 135. Thus, for example, server(s) 120 may provide device(s) 130 with programming in response to the input of the uses of the individual devices. Further, different devices 130 may be operable using different sets of instructions, that is having one of a variety of different "device platforms." Differing device platforms may result, for example and without limitation, to different operating systems, different versions of an operating system, or different versions of virtual machines on the same operating system. In some embodiments, devices 130 are provided with some programming from authoring system 100 that is particular to the device.

In one embodiment, system 100 provides permits a user of authoring platform 110 to provide instructions to each of the plurality of devices 130 in the form of a device- or device-platform specific instructions for processor 135 of the device, referred to herein and without limitation as a "Player," and a device-independent program, referred to herein and without limitation as an "Application" Thus, for example, authoring platform 110 may be used to generate programming for a plurality of devices 130 having one of several different device platforms. The programming is parsed into instructions used by different device platforms and instructions that are independent of device platform. Thus in one embodiment, device 130 utilizes a Player and an Application to execute programming from authoring platform 110. A device having the correct Player is then able to interpret and be programmed according to the Application.

In one alternative embodiment, the Player is executed the first time by device 130 ("activated") through an Application directory. In another alternative embodiment, the Player is activated by a web browser or other software on device 130. In yet another alternative embodiment, Player is activated through a signal to device 130 by a special telephone numbers, such as a short code.

When the Application and the Player are provided to memory 133, the functioning of device 130 may occur in accordance with the desired programming. Thus in one embodiment, the Application and Player includes programming instructions which may be stored in memory 133 and which, when executed by processor 135, generate the designed displays on screen 137. The Application and Player may also include programming instructions which may be stored in memory 133 and which provide instructions to processor 135 to accept input from input device 139.

Authoring tool 112 may, for example, produce and store within memory 111 a plurality of Players (for different devices 130) and a plurality of Applications for displaying pages on all devices. The Players and Applications are then stored on one or more servers 120 and then provided to individual devices 130. In general, Applications are provided to device 130 for each page of display or a some number of pages. A Player need be provided once or updated as necessary, and thus may be used to display a large number of Applications. This is advantageous for the authoring process, since all of the device-dependent programming is provided to a device only once (or possibly for some small number of upgrades), permitting a smaller Application, which is the same for each device 130.

Thus, for example and without limitation, in one embodiment, the Player transforms device-independent instructions of the Application into device-specific instructions that are executable by device 130. Thus, by way of example and without limitation, the Application may include Java programming for generating a display on screen 137, and the Player may interpret the Java and instruct processor 135 to produce the display according to the Application for execution on a specific device 130 according to the device platform. The Application may in general include, without limitation, instructions for generating a display on screen 137, instructions for accepting input from input device 139, instructions for interacting with a user of device 130, and/or instructions for otherwise operating the device, such as to place a telephone call.

The Application is preferably code in a device-independent format, referred to herein and without limitation as a Portable Description Language (PDL). The device's Player interprets or executes the Application to generate one or more "pages" ("Applications Pages") on a display as defined by the PDL. The Player may include code that is device-specific—that it, each device is provided with a Player that is used in the interpretation and execution of Applications. Authoring tool 112 may thus be used to design one or more device-independent Applications and may also include information on one or more different devices 130 that can be used to generate a Player that specific devices may use to generate displays from the Application.

In one embodiment, system 100 provides Players and Applications to one server 120, as in FIG. 1A. In another embodiment, system 100 provides Players to a first server 120*a* and Applications to a second server 120*b*, as in FIG. 1B.

In one embodiment, authoring tool 112 may be used to program a plurality of different devices 130, and routines 114 may include device-specific routines. In another embodiment, the Player is of the type that is commonly referred to as a "thin client"—that is, software for running on the device as a client in client-server architecture with a device network which depends primarily on a central server for processing activities, and mainly focuses on conveying input and output between the user and the server.

In one embodiment, authoring platform 110 allows user to arrange objects for display on screen. A graphical user interface ("GUI," or "UI") is particularly well suited to arranging objects, but is not necessary. The objects may correspond to one or more of an input object, an output object, an action object, or may be a decorative display, such as a logo, or background color or pattern, such as a solid or gradient fill. In another embodiment, authoring platform 110 also permits a user to assign actions to one or more of an input object, an output object, or an action object. In yet another embodiment, authoring platform 110 also permits a user to bind one or more of an input object, an output object, or an action object with web services or web components, or permits a user to provide instructions to processor 135 to store or modify information in memory 133, to navigate to another display or service, or to perform other actions, such as dialing a telephone number.

In certain embodiments, the applicant model used in developing and providing Applications is a PDL. The PDL can be conceptually viewed as a device, operating system and virtual machine agnostic representation of Java serialized objects. In certain embodiments, the PDL is the common language for authoring tool 112, the Application, and Player. Thus while either designing the Application with the authoring tool 112, or programming with the SDK, the internal representation of the programming logic is in Java. In one embodiment the SDK is used within a multi-language software development platform comprising an IDE and a plug-in system to extend it, such as the Eclipse Integrated Development Environment (see, for example, http://www.eclipse.org/). At publish time the Java code is translated into a PDL. This translation may also occur in real-time during the execution of any Web Services or backend business logic that interacts with the user.

One embodiment for compacting data that may be used is described in co-pending U.S. Pat. No. 6,546,397 to Rempell ("Rempell"), the contents of which are incorporated herein by reference. In that patent the compressed data is described as being a database. The terminology used here is a PDL, that is the "internal database" of Rempell is equivalent to the PDL of the present Application.

The use of a PDL, as described in Rempell, permits for efficient code and data compaction. Code, as well as vector, integer and Boolean data may be compacted and then compressed resulting in a size reduction of 40 to 80 times that of the original Java serialized objects. This is important not only for performance over the network but for utilizing the virtual memory manager of the Player more efficiently. As an example, the reassembled primitives of the Java objects may first undergo logical compression, followed by LZ encoding.

The use of a PDL also provides virtual machine and operating system independence. Since the reassembled primitives of the Application no longer have any dependencies from the original programming language (Java) that they were defined in. The PDL architecture takes full advantage of this by abstracting all the virtual machine and/or operating system interfaces from the code that processes the PDL.

In one embodiment, the PDL is defined by the means of nested arrays of primitives. Accordingly, the use of a PDL provides extensibility and compatibility, with a minimal amount of constraints in extending the Player seamlessly as market demands and device capabilities continue to grow. Compatibility with other languages is inherent based on the various Player abstraction implementations, which may be, for example and without limitation, Java CDC, J2SE or MIDP2 implementations.

In one embodiment, the architecture of Player P includes an abstraction interface that separates all device, operating system and virtual machine dependencies from the Player's Application model business logic (that is, the logic of the server-side facilities) that extend the Application on the Player so that it is efficiently integrated into a comprehensive client/server Application. The use of an abstraction interface permits the more efficient porting to other operating systems and virtual machines and adding of extensions to the Application model so that a PDL can be implemented once and then seamlessly propagated across all platform implementations. The Application model includes all the currently supported UI objects and their attributes and well as all of the various events that are supported in the default Player. Further, less robust platforms can be augmented by extending higher end capabilities inside that platform's abstraction interface implementation.

In one embodiment, authoring platform 110 provides one or more pages, which may be provided in one Application, or a plurality of Applications, which are stored in memory 123 and subsequently provided to memory 133. In certain embodiments, the Application includes instructions R to request content or web services C from content server 140. Thus, for example and without limitation, the request is for information over the network via a web service, and the request R is responded to with the appropriate information for display on device 130. Thus, for example, a user may request a news report. The Application may include the layout of the display, including a space for the news, which is downloaded form content server 140 for inclusion on the display. Other information that may be provided by content server 140 may include, but is not limited to, pages, Applications, multimedia, and audio.

Figure 2A:
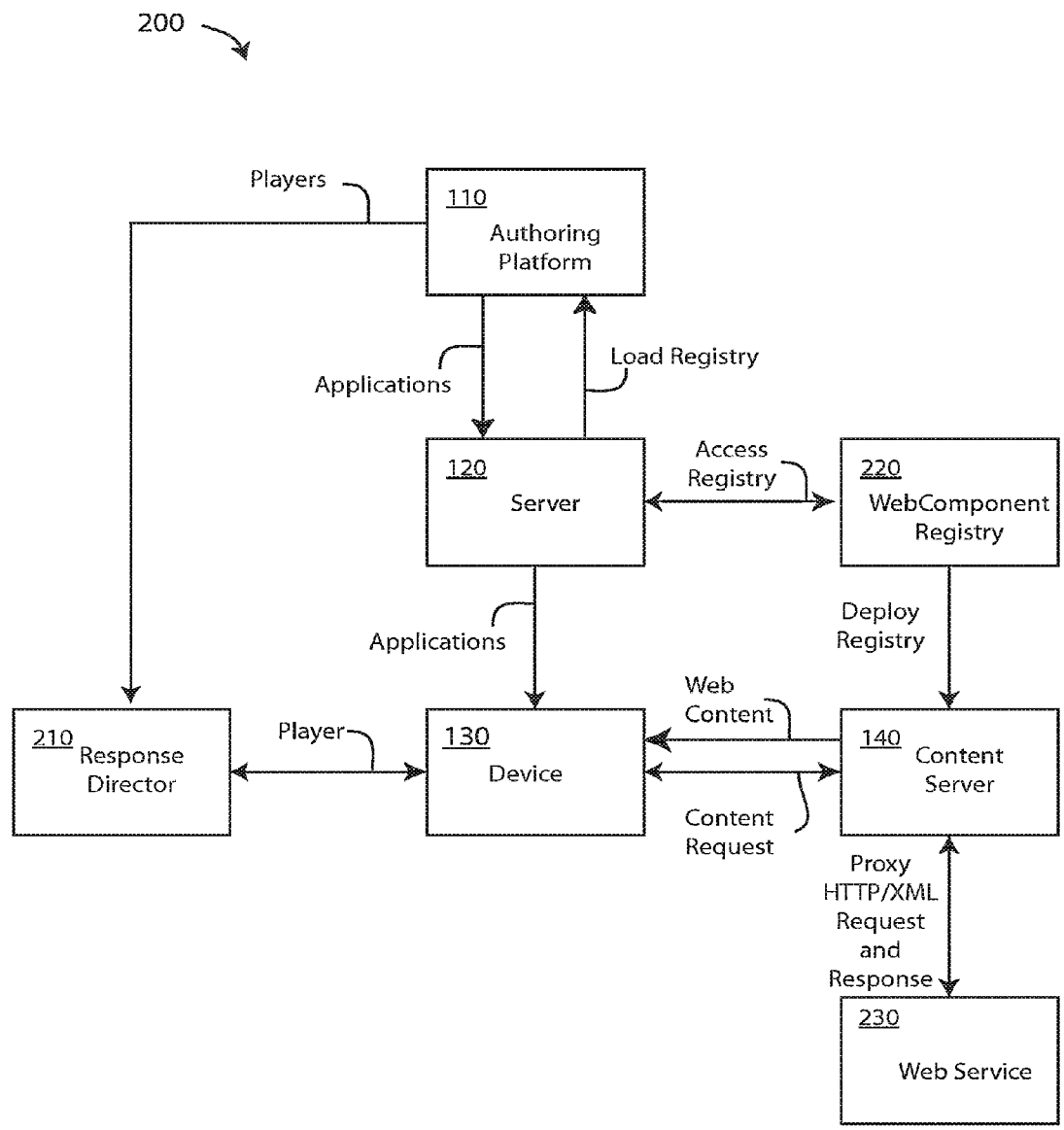
FIG. 2A is a schematic of an embodiment of system illustrating the communications between different system components.

FIG. 2A is a schematic of a system 200 of an embodiment of system 100 illustrating the communications between different system components. System includes a response director 210, a web component registry 220, and a web service 230. System 200 further includes authoring platform 110, server 120, device 130 and content server 140 are which are generally similar to those of the embodiments of FIGS. 1A and 1B, except as explicitly noted.

Response director 210 is a computer or computer system that may be generally similar to server 120 including the ability to communicate with authoring platform 110 and one or more devices 130. In particular, authoring platform 110 generates one or more Players (each usable by certain devices 130) which are provided to response director 210. Devices 130 may be operated to provide response director 210 with a request for a Player and to receive and install the Player. In one embodiment, device 130 provides response director 210 with device-specific information including but not limited to make, model, and/or software version of the device. Response director 210 then determines the appropriate Player for the device, and provides the device with the Player over the network.

Web service 230 is a plurality of services obtainable over the Internet. Each web service is identified and/or defined as an entry in web component registry 230, which is a database, XML file, or PDL that exists on a computer that may be a server previously described or another server 120. Web component registry 230 is provided through server 120 to authoring platform 110 so that a user of the authoring platform may bind web services 230 to elements to be displayed on device 130, as described subsequently.

In one embodiment, authoring platform 110 is used in conjunction with a display that provides a WYSIWYG environment in which a user of the authoring platform can produce an Application and Player that produces the same display and the desired programming on device 130. Thus, for example, authoring tool 112 provides a display on screen 115 that corresponds to the finished page that will be displayed on screen 137 when an Application is intercepted, via a Player, on processor 135 of device 130.

Authoring platform 110 further permits a user of the authoring platform to associate objects, such as objects for presenting on screen 137, with components of one or more web services 230 that are registered in web component registry 220. In one embodiment, information is provided in an XML file to web component registry 220 for each registered components of each web service 230. Web component registry 220 may contain consumer inputs related to each web service 230, environmental data such as PIM, time or location values, persistent variable data, outputs related to the web service, and/or optional hinting for improving the user's productivity.

A user of authoring platform 110 of system 200 may define associations with web services as WebComponent Bindings. In one embodiment, authoring platform 110 allows a user to associate certain objects for display that provide input or output to components of web service 230. The associated bindings are saved as a PDL in server 120.

In one embodiment, an XML web component registry 220 for each registered web service 230 is loaded into authoring platform 110. The user of system 200 can then assign components of any web service 230 to an Application without any need to write code. In one embodiment, a component of web service 230 is selected from authoring platform 110 which presents the user with WYSIWYG dialog boxes that enable the binding of all the inputs and outputs of component of web service 230 to a GUI component of the Application as will be displayed on screen 137. In addition, multiple components of one or more web service 230 can be assigned to any Object or Event in order to facilitate mashups. These Object and/or Event bindings, for each instance of a component of any web service 230, are stored in the PDL. The content server 140 handles all communication between device 130 and the web service 230 and can be automatically deployed as a web application archive to any content server.

Device 130, upon detecting an event in which a component of a web service 230 has been defined, assembles and sends all related inputs to content server 240, which proxies the request to web service 230 and returns the requested information to device 130. The Player on device 130 then takes the outputs of web service 230 and binds the data to the UI components in the Application, as displayed on screen 137.

In one embodiment, the mechanism for binding the outputs of the web service to the UI components is through symbolic references that matches each output to the symbolic name of the UI component. The outputs, in one embodiment, may include meta-data which could become part of the inputs for subsequent interactions with the web service.

For example, if a user of authoring platform 110 wants to present an ATOM feed on device 130, they would search through a list of UI Components available in the authoring platform, select the feed they want to use, and bind the output of the feed summary to a textbox. The bindings would be saved into the PDL on server 120 and processed by device 130 at runtime. If the ATOM feed does not exist a new one can be added to the web component registry that contains all the configuration data required, such as the actual feed URL, the web component manager URL, and what output fields are available for binding.

In another embodiment, components of web services 230 are available either to the user of authoring platform 110 or otherwise accessible through the SDK and Java APIs of routines 114. System 200 permits an expanding set of components of web services 230 including, but not limited to: server pages from content server 120; third-party web services including, but not limited to: searching (such through Google or Yahoo), maps (such as through MapQuest and Yahoo), storefronts (such as through ThumbPlay), SMS share (such as through clickatel), stock quotes, social networking (such as through FaceBook), stock quotes, weather (such as through Accuweather) and/or movie trailers. Other components include web services for communication and sharing through chats and forums and rich messaging alerts, where message alerts are set-up that in turn could have components of Web Services 230 defined within them, including the capture of consumer generated and Web Service supplied rich media and textual content.

System 200 also permits dynamic binding of real-time content, where the inputs and outputs of XML web services are bound to GUI components provided on screen 137. Thus, for example, a user of authoring platform 110 may bind attributes of UI Objects to a particular data base field on a Server. When running the Application, the current value in the referenced data base will be immediately applied. During the Application session, any other real time changes to these values in the referenced data base will again be immediately displayed.

As an example of dynamic binding of real-time content, an RSS feeds and other forms of dynamic content may be inserted into mobile Applications, such as device 130, using system 200. Authoring platform 110 may include a "RSS display" list which permits a user to select RSS channels and feeds from an extensible list of available dynamic content. Meta data, such as titles, abstracts and Images can be revealed immediately by the user as they traverse this RSS display list, bringing the PC experience completely and conveniently to mobile devices 130. In addition, Authoring platform 110 may include a dialog box that dynamically links objects to data and feeds determined by RSS and chat databases. Any relevant attribute for a page view and/or object can be dynamically bound to a value in a server-side database. This includes elements within complex objects such as: any icon or text element within a graphical list; any icon within a launch strip; any feature within any geographical view of a GIS service object; and/or any virtual room within a virtual tour.

As an example of third-party web services 230 that may be provided using system 200, a user of authoring platform 110 can place, for example, Yahoo maps into device 130 by binding the required component of the Yahoo Maps Web Service, such as Yahoo Map's Inputs and/or Outputs to appropriate Objects of authoring platform 110. System 200 also provides binding to web services for text, image and video searching by binding to components of those web services.

In one embodiment, an Application for displaying on device 130 includes one or more Applications Pages, each referred to herein as an "XSP," that provides functionality that extends beyond traditional web browsers. The XSP is defined as a PDL, in a similar manner as any Application, although it defines a single page view, and is downloaded to the Player dynamically as required by the PDL definition of the Application. Thus, for example, while JSPs and ASPs, are restricted to the functionality supported by the web browser, the functionality of XSPs can be extended through authoring platform 110 having access to platform dependent routines 114, such as Java APIs. Combined with dynamic binding functionality, an XSP, a page can be saved as a page object in an author's "pages" library, and then can be dynamically populated with real-time content simultaneously as the page is downloaded to a given handset Player based on a newly expanded API. XSP Server Pages can also be produced programmatically, but in most cases authoring platform 110 will be a much more efficient way to generate and maintain libraries of dynamically changing XSPs.

With XSPs, Applications Pages that have dynamic content associated with them can be sent directly to device 130, much like how a web browser downloads an HTML page through a external reference. Without XSPs, content authors would have to define each page in the Application. With XSPs, no pages need to be defined. Thus, for example, in a World Cup Application, one page could represent real-time scores that change continuously on demand. With polling (for example, a prompt to the users asking who they predict will win a game), a back-end database would tabulate the information and then send the results dynamically to the handsets. With a bar chart, the Application would use dynamic PDL with scaling on the fly. For example, the server would recalibrate the bar chart for every ten numbers.

Other combinations of components of web services 230 include, but are not limited to, simultaneous video chat sessions, inside an integrated page view, with a video or television station; multiple simultaneous chat sessions, each with a designated individual and/or group, with each of the chat threads visible inside an integrated page view.

Another extension of an XSP is a widget object. Widgets can be developed from numerous sources including, but not limited to, authoring platform 110, a Consumer Publishing Tool, and an XML to Widget Conversion Tool where the SDK Widget Libraries are automatically populated and managed, or Widget Selection Lists that are available and can be populated with author defined Icons.

Applications, Players, and Processing in a Device

Figure 2B:
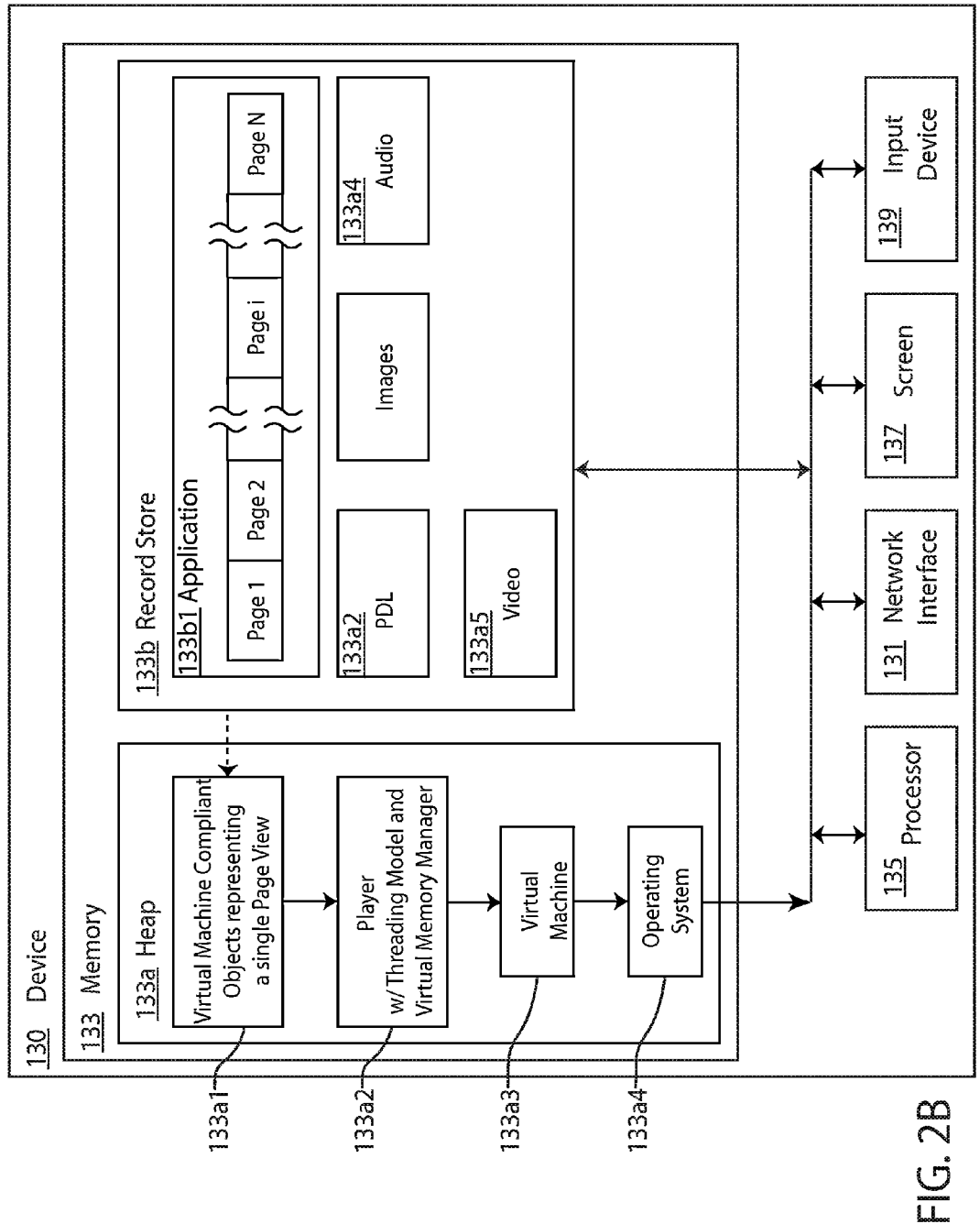
FIG. 2B is a schematic of one embodiment of a device illustrating an embodiment of the programming generated by authoring platform.

FIG. 2B is a schematic of one embodiment of a device 130 illustrating an embodiment of the programming generated by authoring platform 110. Memory 133 may include several different logical portions, such as a heap 133a, a record store 133b and a filesystem (not shown).

As shown in FIG. 2B, heap 133a and record store 133b include programming and/or content. In general, heap 133a is readily accessible by processor 135 and includes, but is not limited to portions that include the following programming: a portion 133a1 for virtual machine compliant objects representing a single Page View for screen 137; a portion 133a2 for a Player; a portion 133a3 for a virtual machine; and a portion 133a4 for an operating system.

Record store 133b (or alternatively the filesystem) includes, but is not limited to, portions 133b1 for Applications and non-streaming content, which may include portions 133a2 for images, portions 133a4 for audio, and/or portions 133a5 for video, and portions 133b2 for non-Application PDLs, such as a Master Page PDL for presenting repeating objects, and Alerts, which are overlayed on the current page view. Other content, such as streaming content may be provided from network interface 131 directly to the Media Codec of device 130 with instructions from Player on how to present the audio or video.

In one embodiment, the Player includes a Threading Model and a Virtual Memory Manager. The Threading Model first manages a queue of actions that can be populated based on Input/Output events, Server-side events, time-based events, or events initiated by user interactions. The Threading Model further manages the simultaneous execution of actions occurring at the same time. The Virtual Memory Manager includes a Logical Virtual Page controller that provides instructions from the record store to the heap, one page at time. Specifically, the Virtual Memory Manager controls the transfer of one of the Application Pages and its virtual machine compliant objects into portion 133a1 as instructions readable by the Player or Virtual Machine. When the Player determines that a new set of instructions is required, the information (such as one Application Page is retrieve from the Record store, converted into virtual machine compliant objects (by processor 135 and according to operation by the Player, Virtual Machine, etc), and stored in heap 133a. Alternatively, the Player may augment virtual machine compliant objects with its own libraries for managing user interactions, events, memory, etc.

The connection of portions 133a1, 133a2, 133a3, 133a4, record store 133b and processor 135 are illustrative of the logical connection between the different types of programming stored in Heap 133a and record store 133b, that is, how data is processed by processor 135.

The Player determines which of the plurality of Application Pages in portion 133b1 is required next. This may be determined by input actions from the Input Device 139, or from instructions from the current Application Page. The Player instructs processor 135 to extract the PDF from that Applications Page and store it in portion 133a1. The Player then interprets the Application Page extracted from PDL which in turn defines all of the virtual machine compliant Objects, some of which could have attributes that refer to images, audio, and/or video stored in portions 133a3, 133a4, 133a5, respectively.

The Virtual Machine in portion 133a3 processes the Player output, the Operating System in portion 133a3 processes the Virtual Machine output which results in machine code that is processed by the Operating System in portion 133a4.

In another embodiment, the Player is a native program that interacts directly with the operating system.

Embodiments of a Publishing Environment

In one embodiment, authoring platform 110 includes a full-featured authoring tool 112 that provides a what-you-see-is-what-you-get (WYSIWYG) full featured editor. Thus, for example, authoring tool 112 permits a user to design an Application by placing objects on canvas 305 and optionally assigning actions to the objects and save the Application. System 100 then provides the Application and Player to a device 130. The Application as it runs on device 130 has the same look and operation as designed on authoring platform 110. In certain embodiments, authoring platform 110 is, for example and without limitation, a PC-compatible or a Macintosh computer.

Authoring platform 110 produces an Application having one or more Applications Pages, which are similar to web pages. That is, each Applications Page, when executed on device 130 may, according to its contents, modify what is displayed on screen 137 or cause programming on the device to change in a manner similar to how web pages are displayed and navigated through on a website.

In one embodiment, authoring tool 112 allows a user to place one or more objects on canvas 305 and associate the objects with an Applications Pages. Authoring platform 110 maintains a database of object data in memory 111, including but not limited to type of object, location on which page, and object attributes. The user may add settings, events, animations or binding to the object, from authoring tool 112, which are also maintained in memory 111. Authoring tool 112 also allows a user to define more than one Applications Page.

In another embodiment, authoring tool 112, provides Java programming functions of the Java API for specific devices 130 as pull-down menus, dialog boxes, or buttons. This permits a user of authoring platform 110 to position objects that, after being provided as an Application to device 130, activate such Java functions on the device.

In certain embodiments, authoring platform 110, as part of system 100, permits designers to include features of advanced web and web services Applications for access by users of device 130. Some of the features of advanced web and web services include, but are not limited to: slide shows, images, video, audio, animated transitions, multiple chats, and mouse interaction; full 2-D vector graphics; GIS (advanced LBS), including multiple raster and vector layers, feature sensitive interactions, location awareness, streaming and embedded audio/video, virtual tours, image processing and enhancement, and widgets. In other embodiments the features are provided for selection in authoring platform 110 through interactive object libraries.

In certain embodiments, authoring platform 110, as part of system 100, allows the inclusion of child objects which may eventually be activated on device 130 by the user of the device or by time. The uses of the child objects on device 130 include, but are not limited to: mouse over (object selection), hover and fire events and launching of object-specific, rich-media experiences.

In certain other embodiments, authoring platform 110, as part of system 100, provides advanced interactive event models on device 130, including but not limited to: user-, time- and/or location-initiated events, which allow content developers to base interactivity on specific user interactions and/or instances in time and space; timelines, which are critical for timing of multiple events and for animations when entering, on, or exiting pages of the Application; waypoints, which act similar to key frames, to allow smooth movement of objects within pages of the Application. Waypoints define positions on a page object's animation trajectory. When an object reaches a specific waypoint other object timelines can be initiated, creating location-sensitive multiple object interaction, and/or audio can be defined to play until the object reaches the next waypoint.

Authoring platform 110 may also define a Master Page, which acts as a template for an Applications Page, and may also define Alert Pages, which provide user alerts to a user of device 130.

In certain embodiments, authoring platform 110, as part of system 100, provides full style inheritance on device 130. Thus, for example and without limitation, both master page inheritance (for structural layout inheritance and repeating objects) and object styles (for both look and feel attribute inheritance) are supported. After a style has been defined for an object, the object will inherit the style. Style attributes include both the look and the feel of an object, including mouse interaction, animations, and timelines. Each page may include objects that may be a parent object or a child object. A child object is one that was created by first selecting a parent object, and then creating a child object. Child objects are always part of the same drawing layer as its parent object, but are drawn first, and are not directly selectable when running the Application. A parent object is any object that is not a child object, and can be selected when running the Application.

As an example, the user of authoring tool 112 may create various text objects on canvas 305 using a style that sets the font to red, the fonts of these objects will be red. Suppose user of authoring tool 112 changes the font color of a specific button to green. If later, the user of authoring tool 112 changes the style to blue; all other text objects that were created with that style will become blue except for the button that had been specifically set to green.

In certain other embodiments, authoring platform 110 provides page view, style, object, widget and Application template libraries. Authoring platform 110 may provide templates in private libraries (available to certain users of the authoring platform) and public libraries (available to all users of the authoring platform). Templates may be used to within authoring platform 110 to define the look and feel of the entire Application, specific pages, or specific slide shows and virtual tours a seen on device 130.

Figure 3A:
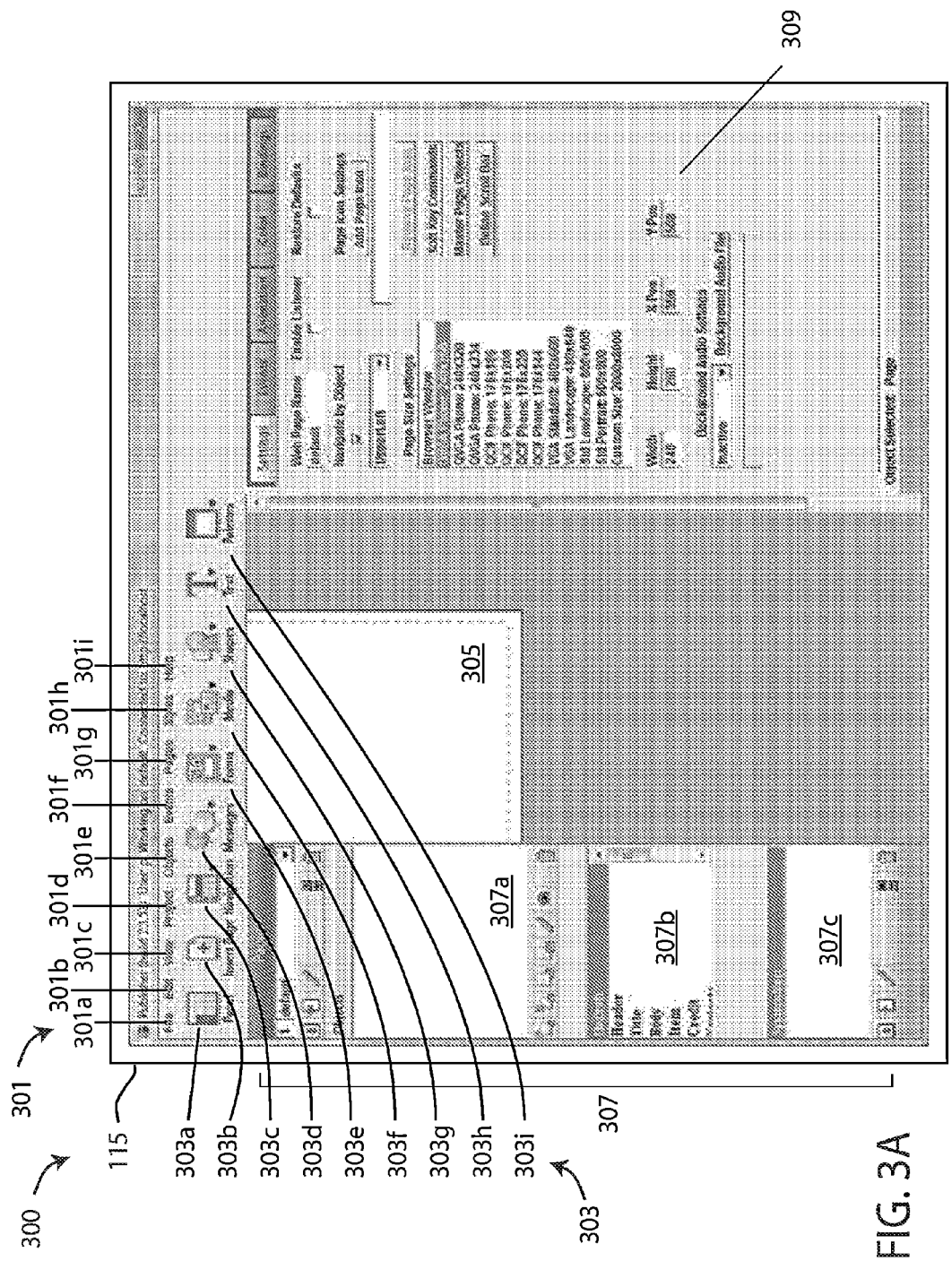
FIGS. 3A and 3B illustrate one embodiment of a publisher interface as it appears, for example and without limitation, on a screen while executing an authoring tool.
Figure 3B:
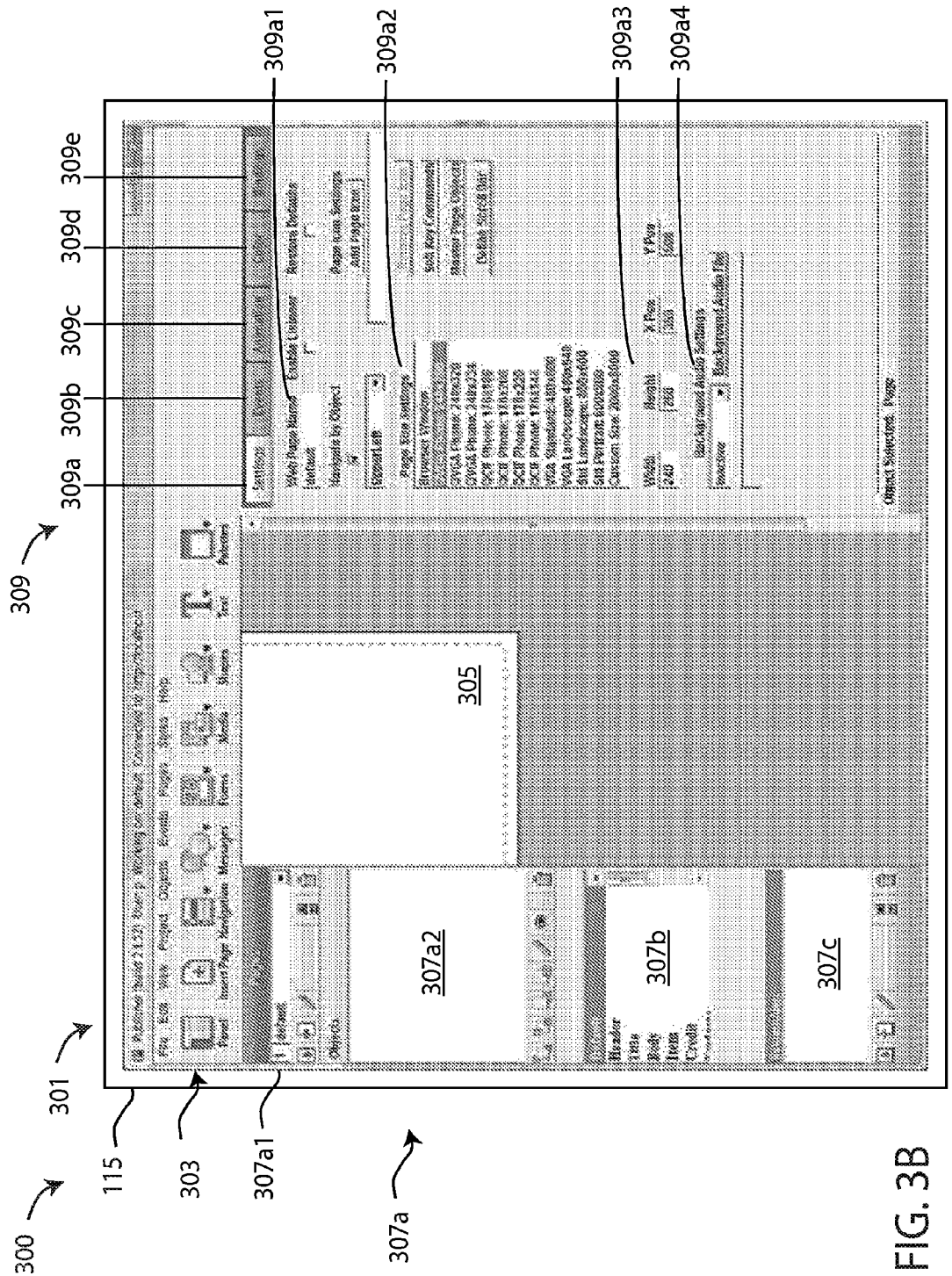

FIGS. 3A and 3B illustrate one embodiment of a publisher interface 300 as it appears, for example and without limitation, on screen 115 while executing authoring tool 112. In one embodiment, publisher interface 300 includes a Menu bar 301, a Tool bar 303, a Canvas 305, a Layer Inspector 307 having subcomponents of a page/object panel 307a, an object style panel 307b, and a page alert panel 307c, and a Resource Inspector 309.

In general, publisher interface 300 permits a user of authoring platform 110 to place objects on canvas 305 and then associate properties and/or actions to the object, which are stored in the Application. As described subsequently, publisher interface 300 permits a user to program a graphical interface for the screen 137 of device 130 on screen 115 of authoring platform 110, save an Application having the programming instructions, and save a Player for the device. The intended programming is carried out on device 130 when the device, having the appropriate device platform Player, receives and executes the device-independent Application.

Thus, for example, authoring tool 112 maintains, in memory 111, a list of every type of object and any properties, actions, events, or bindings that may be assigned to that object. As objects are selected for an Application, authoring tool 112 further maintains, in memory 111, a listing of the objects. As the user selects objects, publisher interface 300 provides the user with a choice of further defining properties, actions, events, or bindings that may be assigned to each particular object, and continues to store the information in memory 111.

In one embodiment, publisher interface 300 is a graphical interface that permits the placement and association of objects in a manner typical of, for example, vector graphics editing programs (such as Adobe Illustrator). Objects located on canvas 305 placed and manipulated by the various commands within publisher interface 300 or inputs such as an input device 117 which may be a keyboard or mouse. As described herein, the contents of canvas 305 may be saved as an Application that, through system 100, provide the same or a similar placement of objects on screen 137 and have actions defined within publisher interface 300. Objects placed on canvas 305 are intended for interaction with user of device 130 and are referred to herein, without limitation, as objects or UI (user interface) objects. In addition, the user of interface 300 may assign or associate actions or web bindings to UI objects placed on canvas 305 with result in the programming device 130 that cause it to respond accordingly.

Objects include, but are not limited to input UI objects, response UI objects. Input UI objects include but are not limited to: text fields (including but not limited to alpha, numeric, phone number, or SMS number); text areas; choice objects (including but not limited to returning the selected visible string or returning a numeric hidden attribute); single item selection lists (including but not limited to returning the selected visible string or returning a numeric hidden attribute); multi item selection lists (including but not limited to returning all selected items (visible text string or hidden attribute) or cluster item selection lists (returning the hidden attributes for all items).

Other input UI objects include but are not limited to: check boxes; slide show (including but not limited to returning a numeric hidden attribute, returning a string hidden attribute, or returning the hidden attributes for all slides); and submit function (which can be assigned to any object including submit buttons, vectors, etc.).

Response UI Objects may include, but are not limited to: single line text objects, which include: a text Field (including but not limited to a URL, audio URL, or purchase URL), a text button, a submit button, or a clear button. Another response UI objects include: a multiple line text object, which may include a text area or a paragraph; a check box; an image; a video; a slide show (with either video or image slides, or both); choice objects; list objects; or control lists, which control all the subordinate output UI objects for that web component. Control list objects include, but are not limited to: list type or a choice type, each of which may include a search response list or RSS display list.

As a further example of objects that may be used with authoring tool 112, Table I lists Data Types, Preferred Input, Input Candidates, Preferred Output and Output Candidates for one embodiment of an authoring tool.

TABLE I

| Data Types | Preferred Input | Input Candidates | Preferred Output | Output Candidates |
|---|---|---|---|---|
| boolean | Check Box | Check Box | Check Box | Check Box |
| Int | Text Field (integer) | Text Field (integer) | Text Field (integer) | Text Field (integer) |
| | | Text Field (Phone #) | | Text Field (Phone #) |
| | | Text Field (SMS #) | | Text Field (SMS #) |
| | | Choice | | Choice |
| | | List (single select) | | List (single select) |
| | | | | Text Button |
| String | Text Field (Alpha) | Any | Text Field (Alpha) | Any |
| multilineString | Text Area | Text Area | Text Area | Text Area |
| | | | | Paragraph |
| ImageURL | N/A | N/A | Image | Image |
| | | | | Slide Show |
| VideoURL | N/A | N/A | Video | Video |
| | | | | Slide Show |
| List | Single Item List | Single Item List | Single Item List | Any List Type |
| | | Multi-Select List | | Any Choice Type |
| | | Complex List | | (see Complex |
| | | Choice | | List Specification) |
| | | Slide Show | | |
| ComplexList | Complex List | Single Item List | Single Item List | Any List Type |
| | | Multi-Select List | | (see Complex List |
| | | Complex List | | Specification) |
| Slideshow | Slide Show | Slide Show | Slide Show | Slide Show |
| SearchResponseList | N/A | N/A | Search Response List | Search Response List |
| | | | | Control List |
| | | | | Complex List |
| | | | | Choice |
| RSSList | N/A | N/A | RSS Display List | RSS Display List |
| | | | | Control List |
| | | | | Complex List |
| | | | | Choice |
| SingleSelectionList | Choice | Choice | Choice | Choice |
| | | Complex List | | Complex List |
| MultiSelectionList | Multi-Selection List | Multi-Selection List | Multi-Selection List | Multi-Selection List |
| ServiceActivation | Submit Button | Any | N/A | N/A |
| ChannelImageURL | N/A | N/A | Image | Image |
| | | | | Video |
| | | | | Slide Show |
| ChannelDescription | N/A | N/A | Text Area | Text Area |
| | | | | Paragraph |
| | | | | Text Field |
| | | | | Text Button |
| | | | | List |
| | | | | Choice |
| ChannelTitle | N/A | N/A | Text Field | Text Field |
| | | | | Text Button |
| | | | | Paragraph |
| | | | | Text Area |
| | | | | List |
| | | | | Choice |
| URL | | | Text Field | Text Field |
| | | | (URL request) | (URL request) |
| Audio URL | | | Text Field | Text Field |
| | | | (Audio URL request) | (Audio URL request) |
| Purchase URL | | | Text Field | Text Field |
| | | | (Purchase URL request) | (Purchase URL request) |
| Image Data | | | Image | Image |
| | | | | Slide Show |
| Image List Data | | | Slide Show | Slide Show |
| | | | | Image |
| Persistent Variable | N/A | N/A | N/A | N/A |
| Pipeline Multiple Select | Multi-select List | Multi-select List | N/A | N/A |
| | | Complex List | | |
| | | Slide Show | | |
| Phone Number | Text Field | Text Field | Text Field | Text Field |
| | (numeric type) | Text Button | (numeric type) | Text Button |
| Hidden Attribute | Complex List | Complex List | Complex List | Complex List |
| | | Slide Show | | Slide Show |
| Collection List | N/A | N/A | Slide Show | Complex List |
| | | | | Slide Show |

In general, publisher interface 300 permits a user to define an Application as one or more Applications Pages, select UI objects from Menu bar 301 or Tool bar 303 and arrange them on an Applications Page by placing the objects canvas 305. An Application Page is a page that is available to be visited through any navigation event. Application Pages inherit all the attributes of the Master Page, unless that attribute is specifically changed during an editing session.

Authoring platform 110 also stores information for each UI object on each Application Page of an Application. Layer Inspector 307 provides lists of Applications Pages, UI objects on each Applications Page, and Styles, including templates. Objects may be selected from canvas 305 or Layer Inspector 307 causing Resource Inspector 309 to provide lists of various UI objects attributes which may be selected from within the Resource Inspector. Publisher interface 300 also permits a user to save their work as an Application for layer transfer and operation of device 130. Publisher interface 300 thus provides an integrated platform for designing the look and operation of device 130.

The information stored for each UI object depends, in part, on actions which occur as the result of a user of device 130 selecting the UI object from the device. UI objects include, but are not limited to: navigational objects, such as widget or channel launch strips or selection lists; message objects for communicating, such as a multiple chat, video chat, phone and/or SMS lists or fields or a pop-up alert; text fields or areas; check boxes; pull down menus; selection lists and buttons; pictures; slide shows; video or LBS maps; shapes or text defined by a variety of tools; a search response; or an RSS display.

In certain embodiments, publisher interface 300 permits a user to assign action to UI objects, including but not limited to, programming of the device 130 or a request for information over network N. In one embodiment, for example and without limitation, publisher interface 300 has a selection to bind a UI object to a web service—that is, associate the UI object or a manipulation or selection of UI object with web services. Publisher interface 300 may also include many drawing and text input functions for generating displays that may be, in some ways, similar to drawing and/or word processing programs, as well as toolbars and for zooming and scrolling of a workspace.

Each UI object has some form, color, and display location associate with it. Further, for example and without limitation, UI objects may have navigational actions (such as return to home page), communications actions (such as to call the number in a phone number field), or web services (such as to provide and/or retrieve certain information from a web service). Each of the these actions requires authoring platform 110 to store the appropriate information for each action. In addition, UI objects may have associated patent or child objects, default settings, attributes (such as being a password or a phone number), whether a field is editable, animation of the object, all of which may be stored by authoring platform 110, as appropriate.

Menu bar 301 provides access features of publisher interface 300 through a series of pull-down menus that may include, but are not limited to, the following pull-down menus: a File menu 301a, an Edit menu 301b, a View menu 301c, a Project menu 301d, an Objects menu 301e, an Events menu 301f, a Pages menu 301g, a Styles menu 301h, and a Help menu 301i.

File menu 301a provides access to files on authoring platform 110 and may include, for example and without limitation, selections to open a new Application or master page, open a saved Application, Application template, or style template, import a page, alert, or widget, open library objects including but not limited to an image, video, slide show, vector or list, and copying an Application to a user or to Server 120.

Edit menu 301b may include, but is not limited to, selections for select, cut, copy, paste, and edit functions.

View menu 301c may include, but is not limited to, selections for zooming in and out, previewing, canvas 305 grid display, and various palette display selections.

Project menu 301d may include, but is not limited to, selections related to the Application and Player, such as selections that require a log in, generate a universal Player, generate server pages, activate server APIs and extend Player APIs. A Universal Player will include all the code libraries for the Player, including those that are not referenced by the current Application. Server APIs and Player APIs logically extend the Player with Server-side or device-side Application specific logic.

Objects menu 301e includes selections for placing various objects on canvas 305 including, but not limited to: navigation UI objects, including but not limited to widget or channel launch strips or selection lists; message-related UI objects, including but not limited to multiple chat, video chat, phone and/or SMS lists or fields, or a pop-up alert; shapes, which provides for drawing tools; forms-related objects, including but not limited to text fields; scrolling text box, check box, drop-down menu, list menu, submit button or clear button; media-related UI objects such as pictures, slide shows, video or LBS maps; text-related UI objects such as buttons or paragraphs; and variables, including but not limited to time, date and audio mute control.

Events menu 301f includes selections for defining child objects, mouse events, animations or timelines.

Pages menu 301g includes selection for handling multi-page Applications, and may include selections to set a master page, delete, copy, add or go to Applications Pages.

Styles menu 301h includes selections to handle styles, which are the underlying set of default appearance attributes or behaviors that define any object that is attached to a style. Styles are a convenient way for quickly creating complex objects, and for changing a whole collection of objects by just modifying their common style. Selections of Styles menu 301h include, but not limited to, define, import, or modify a style, or apply a template. Help menu 301i includes access a variety of help topics.

Tool bar 303 provides more direct access to some of the features of publisher interface 300 through a series of pull-down menus. Selections under tool bar 303 may include selections to:

control the look of publisher interface 300, such as a Panel selection to control the for hiding or viewing various panels on publisher interface 300;

control the layout being designed, such as an Insert Page selection to permit a user to insert and name pages;

control the functionality of publisher interface 300, such as a Palettes selection to choose from a variety of specialized palettes, such as a View Palette for zooming and controlling the display of canvas 305, a Command Palette of common commands, and Color and Shape Palettes;

place objects on canvas 305, which may include selections such as: a Navigation selection to place navigational objects, such as widget or channel launch strips or selection lists), a Messages selection to place objects for communicating, such as a multiple chat, video chat, phone and/or SMS lists or fields, or a pop-up alert, a Forms selection to place objects such as text fields or areas, check boxes, pull down menus, selection lists, and buttons, a Media selection to place pictures, slide shows, video or LBS maps, and a Shapes selection having a variety of drawing tools, a Text selection for placing text, a search response, or an RSS display, and Palettes.

In one embodiment, Tool bar 303 includes a series of pull-down menus that may include, but are not limited to, items from Menu bar 301 organized in the following pull-down menus: a Panel menu 303a, an Insert Page menu 303b, a Navigation menu 303c, a Messages menu 303d, a Forms menu 303e, a Media menu 303f, a Shapes menu 303g, a Text menu 303h, and a Palettes menu 301i.

Panel menu 303a permits a user of authoring platform 110 to change the appearance of interface 300 by, controlling which tools are on the interface or the size of canvas 305. Insert Page menu 303b permits a user of authoring platform 110 to open a new Application Page. Navigation menu 303c displays a drop down menu of navigational-related objects such as a widget or channel launch strip or selection list. Messages menu 303d displays a drop down menu of messaging-related objects such as multiple chat, video chat, phone or SMS lists or fields, and pop-up alerts. Forms menu 303e displays a drop down menu of forms-related objects including, but not limited to, a text field, a text area, a check box, a drop down menu, a selection list, a submit button, and a clear button. Media menu 303f displays a drop down menu of media-related objects including, but not limited to, a picture, slide show, video or LBS map. Shapes menu 303g displays a drop down menu of draw tools, basic shapes, different types of lines and arrows and access to a shape library. Text menu 303j displays a drop down menu of text-related objects, including but not limited to a text button, paragraph, search response, RSS display and variables such as time and date.

Palettes menu 301i includes a selection of different palettes that can be moved about publisher interface 300, where each palette has specialized commands for making adjustments or associations to objects easier. Palettes include, but are not limited to: a page view palette, to permit easy movement between Applications Pages; a view palette, to execute an Application or zoom or otherwise control the viewing of an Application; a commands palette having editing commands; a color palette for selection of object colors; and a shapes palette to facilitate drawing objects.

Layer inspector 307 permits a user of publisher interface 300 to navigate, select and manipulate UI objects on Applications Pages. Thus, for example, a Page/objects panel 307a of layer inspector 307 has a listing that may be selected to choose an Applications Pages within and Application, and UI objects and styles within an Applications Page. An Object styles panel 307b of layer inspector 307 displays all styles on the Applications Page and permits selection of UI objects for operations to be performed on the objects.

Thus, for example, when objects from Menu bar 301 or Tool bar 303 are placed on canvas 305, the name of the object appears in Page/objects panel 307a. Page/objects panel 307a includes a page display 307a1 and an objects display 307a2. Page display 307a1 includes a pull down menu listing all Applications Pages of the Application, and objects display 307a2 includes a list of all objects in the Applications Page (that is, objects on canvas 305).

In general, page/objects panel 307a displays various associations with a UI object and permits various manipulations including, but not limited to, operations for parent and child objects that are assigned to a page, and operations for object styles, and permits navigating between page types and object styles, such as switching between the master page and Application pages and deselecting object styles and alerts, opening an Edit Styles Dialog Box and deselecting any master, Application or alert page, or selecting an alert page and deselecting any Master Page or Application Page. A parent or child object can also be selected directly from the Canvas. In either case, the Resource Inspector can then be used for modifying any attribute of the selected object.

Examples of operations provided by page/objects panel 307a on pages include, but are not limited to: importing from either a user's private page library or a public page library; deleting a page; inserting a new page, inheriting all the attributes of the Master Page, and placing the new page at any location in the Page List; editing the currently selected page, by working with an Edit Page Dialog Box. While editing all the functions of the Resource Inspector 309 are available, as described subsequently, but are not applied to the actual page until completing the editing process.

Examples of operations provided by of page/objects panel 307a on objects, which may be user interface (UI) objects, include but are not limited to: changing the drawing order layer to: bring to the front, send to the back, bring to the front one layer, or send to the back one layer; hiding (and then reshowing) selected objects to show UI objects obstructed by other UI Objects, delete a selected UI Page Object, and editing the currently selected page, by working with a Edit Page Dialog Box.

Object styles panel 307b of layer inspector 307 displays all styles on the Applications Page and permits operations to be performed on objects, and is similar to panel 307a. Examples of operations provided by object style panel 307b include, but are not limited to: importing from either a user's private object library or a public object library; inserting a new object style, which can be inherited from a currently selected object, or from a previously defined style object; and editing a currently selected object style by working with an Edit Style Dialog Box.

Style attributes can be assigned many attributes, including the look, and behavior of any object that inherits these objects. In addition, List Layout Styles can be created or changed as required. A layout style can define a unbounded set of Complex List Layouts, including but not limited to: the number of lines per item in a list, the number of text and image elements and their location for each line for each item in the last, the color and font for each text element, and the vertical and horizontal offset for each image and text element.

Alerts Panel 307c provides a way of providing alert pages, which can have many of the attributes of Application Pages, but they are only activated through an Event such as a user interaction, a network event, a timer event, or a system variable setting, and will be superimposed onto whatever is currently being displayed. Alert Pages all have transparent backgrounds, and they function as a template overlay, and can also have dynamic binding to real time content.

Resource inspector 309 is the primary panel for interactively working with UI objects that have been placed on the Canvas 305. When a UI object is selected on Canvas 305, a user of authoring platform 110 may associate properties of the selected object by entering or selecting from resource inspector 309. In one embodiment, resource inspector 309 includes five tab selections: Setting Tab 309a, Events Tab 309b, Animation Tab 309c, Color Tab 309d which includes a color palette for selecting object colors, and Bindings Tab 309e.

Settings Tab 309a provides a dialog box for the basic configuration of the selected object including, but not limited to, name, size, location, navigation and visual settings. Depending upon the type of object, numerous other attributes could be settable. As an example, the Setting Tab for a Text Field may include dialog boxes to define the text field string, define the object style, set the font name, size and effects, set an object name, frame style, frame width, text attributes (text field, password field, numeric field, phone number, SMS number, URL request).

As an example of Setting Tab 309a, FIG. 3B shows various selections including, but not limited to, setting 309a1 for the web page name, setting 309a2 for the page size, including selections for specific devices 130, setting 309a3 indicating the width and height of the object, and setting 309a4 to select whether background audio is present and to select an audio file.

Figure 3C:
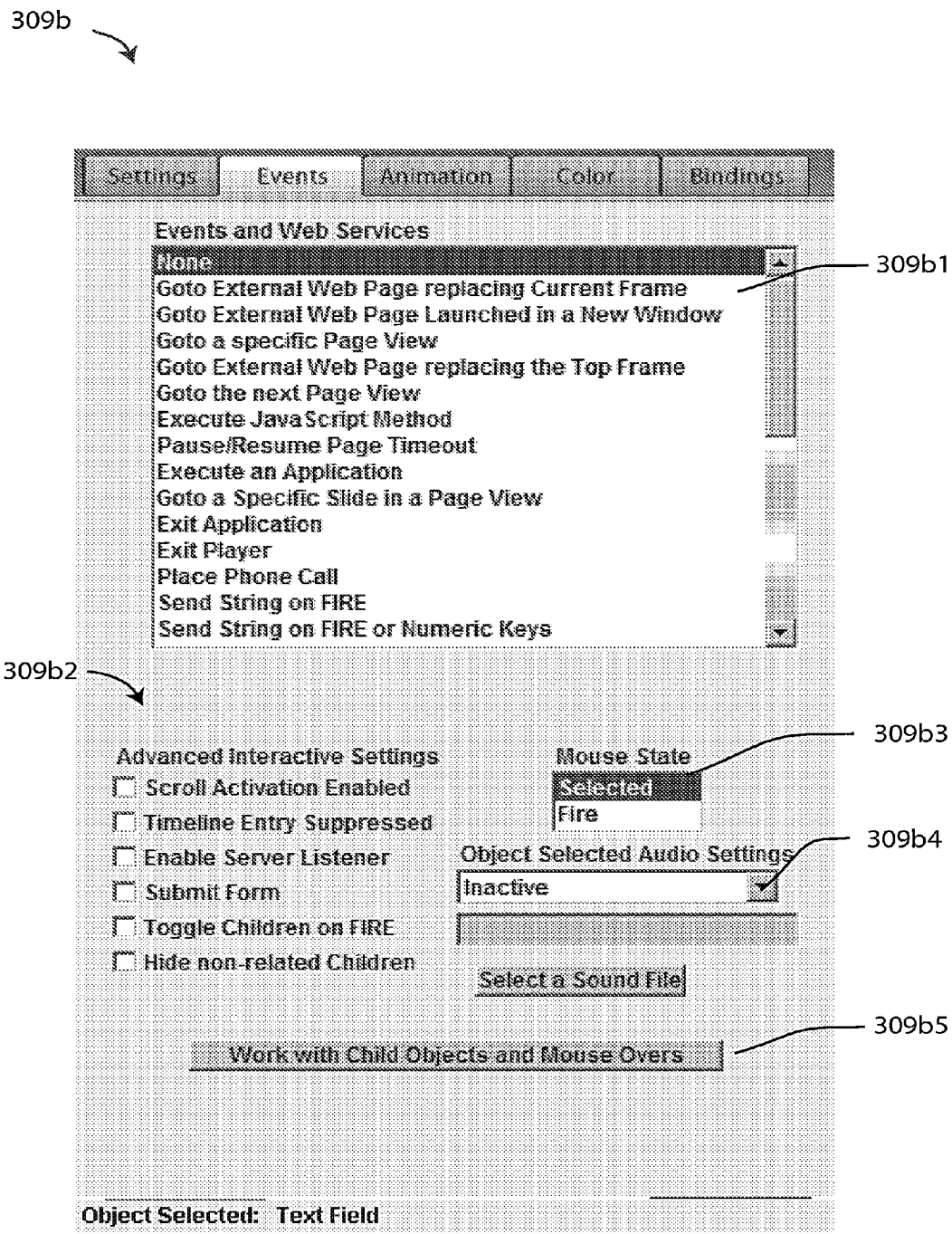
FIG. 3C illustrates an embodiment of the Events Tab'

FIG. 3C illustrates an embodiment of the Events Tab 309b, which includes all end user interactions and time based operations. The embodiment of Events Tab 309b in FIG. 3C includes, for example and without limitation, an Events and Services 309b1, Advanced Interactive Settings 309b2, Mouse State 309b3, Object Selected Audio Setting 309b4, and Work with Child Objects and Mouse Overs button 309b5.

Events and Services 309b1 lists events and services that may be applied to the selected objects. These include, but are not limited to, going to external web pages or other Applications pages, either as a new page or by launching a new window, executing an Application or JavaScript method, pausing or exiting, placing a phone call or SMS message, with or without single or multiple Player download, show launch strip, or go back to previous page. Examples of events and services include, but are not limited to those listed in Table II

TABLE II

Events and Services

| | |
|---|---|
| Goto External Web Page replacing Current Frame | ChoiceObject: Remove Icon from Launch Strip |
| Goto External Web Page Launched in a New Window | Goto a specific Internal Web Page with Alert. "Backend Synchronization" |
| Goto a specific Internal Web Page | Goto Widget Object |
| Goto the next Internal Web Page | Generate Alert. "With a Fire Event" |
| Goto External Web Page replacing the Top Frame | Send SMS Message from Linked Text Field |
| Execute JavaScript Method | Toggle Alert. "Display OnFocus, Hide OffFocus" |
| Pause/Resume Page Timeout | Execute an Application with Alert. "With a Fire Event" |
| Execute an Application | Goto Logical First Page |
| Goto a specific Internal Web Page with setting starting slide | Generate Alert with Backend Synchronization |
| Exit Application | Send SMS Message with Share (Player Download) |
| Exit Player | Place PhoneCall from linked Text Field with Share (Player Download) |
| Place PhoneCall from linked Text Field | Send IM Alert from linked Text Field or Text Area |
| Text Field/Area: Send String on FIRE | Set and Goto Starting Page |
| ChoiceObject: Add Icon to Launch Strip | Populate Image |
| Text Field/Area: Send String on FIRE or Numeric Keys | Preferred Launch Strip |

Advanced Interactive Settings 309b2 include Scroll Activation Enabled, Timeline Entry Suppressed, Enable Server Listener, Submit Form, Toggle Children on FIRE, and Hide Non-related Children, Mouse State 309b3 selections are Selected or Fire. When Mouse State Selected is chosen, Object Selected Audio Setting 309b4 of Inactive, Play Once, Loop, and other responses are presented. When Mouse State Fire is chosen, Object Selected Audio Setting 309b4 is replaced with FIRE Audi Setting, with appropriate choices presented.

When Work with Child Objects and Mouse Overs button 309b5 is selected, a Child Object Mode box pops up, allowing a user to create a child object with shortcut to Menu bar 301 actions that may be used define child objects.

Figure 3D:
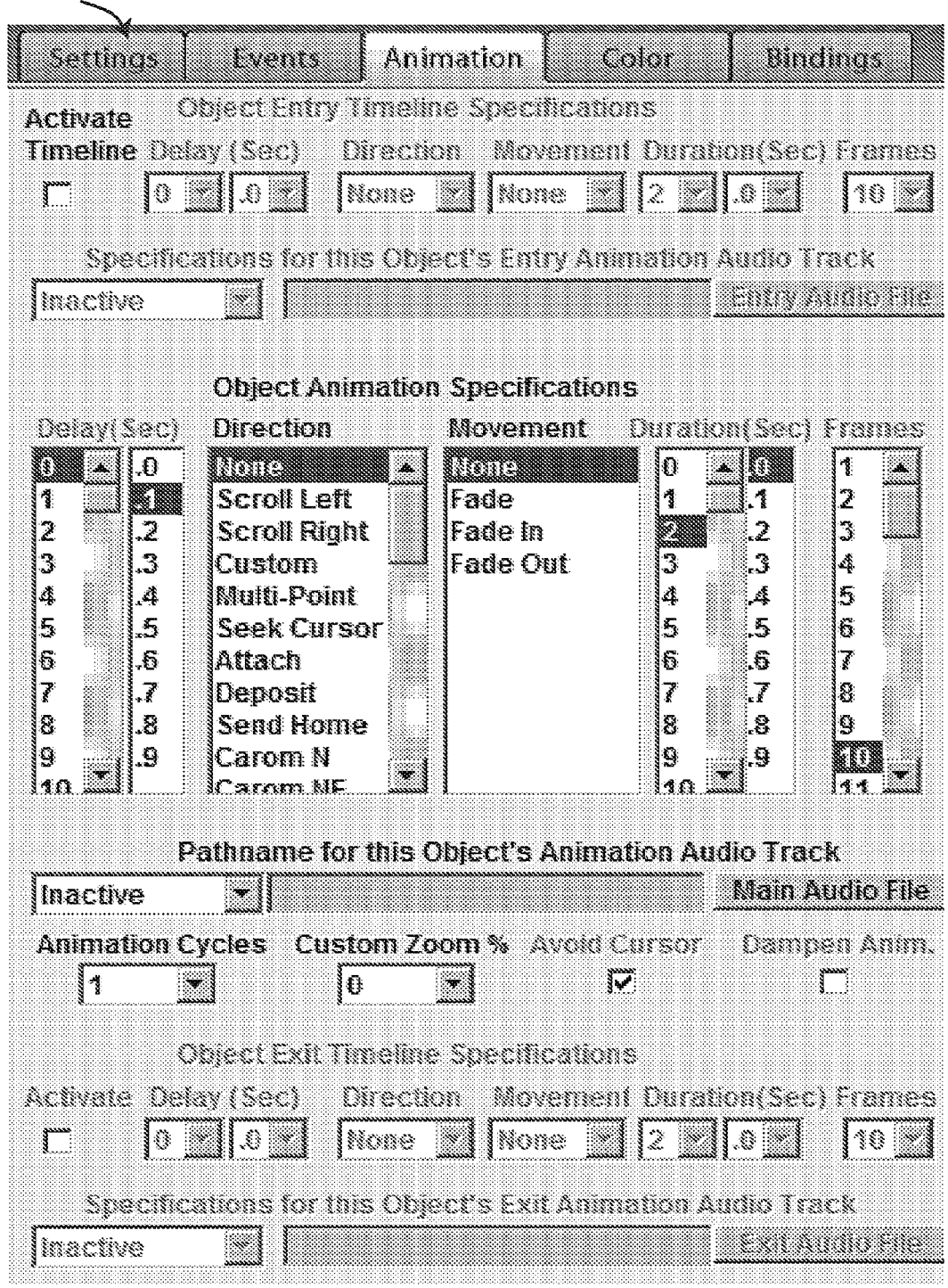
FIG. 3D illustrates one embodiment of an Animation Tab.

FIG. 3D illustrates one embodiment of an Animation Tab 309c, which includes all animations and timelines. The Color Tab includes all the possible color attributes, which may vary significantly by object type.

Animation Tab 309c includes settings involved in animation and timelines that may be associated with objects. One embodiment of Animation Tab 309c is shown, without limitation, in FIG. 3D, and is described, in Rempell ("Rempell").

A Color Tab 309d includes a color palette for selecting object colors.

Bindings Tab 309e is where web component operations are defined and dynamic binding settings are assigned. Thus, for example, a UI object is selected from canvas 305, and a web component may be selected and configured from the bindings tab. When the user's work is saved, binding information is associated with the UI object that will appear on screen 137.

Figure 3E:
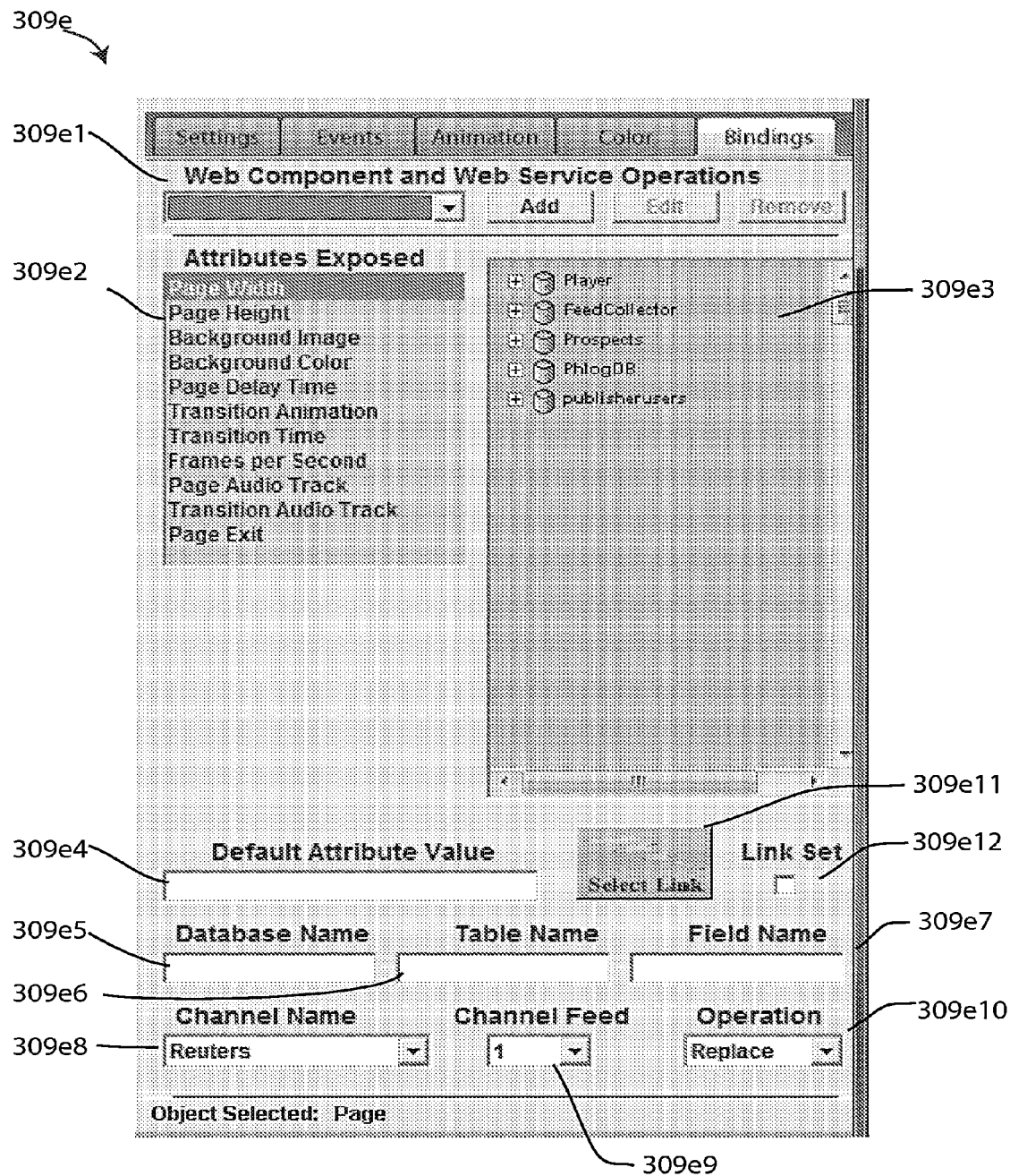
FIG. 3E illustrates one embodiment of Bindings Tab.

FIG. 3E illustrates one embodiment of Bindings Tab and includes, without limitation, the following portions: Web Component and Web Services Operations 309e1, Attributes Exposed list 309e2, panel 309e3 which includes dynamic binding of server-side data base values to attributes for the selected object, Default Attribute Value 309e4, Database Name 309e5, Table Name 309e6, Field Name 309e7, Channel Name 309e8, Channel Feed 309e9, Operation 309e10, Select Link 309e11, and Link Set checkbox 309e12.

Figure 3F:
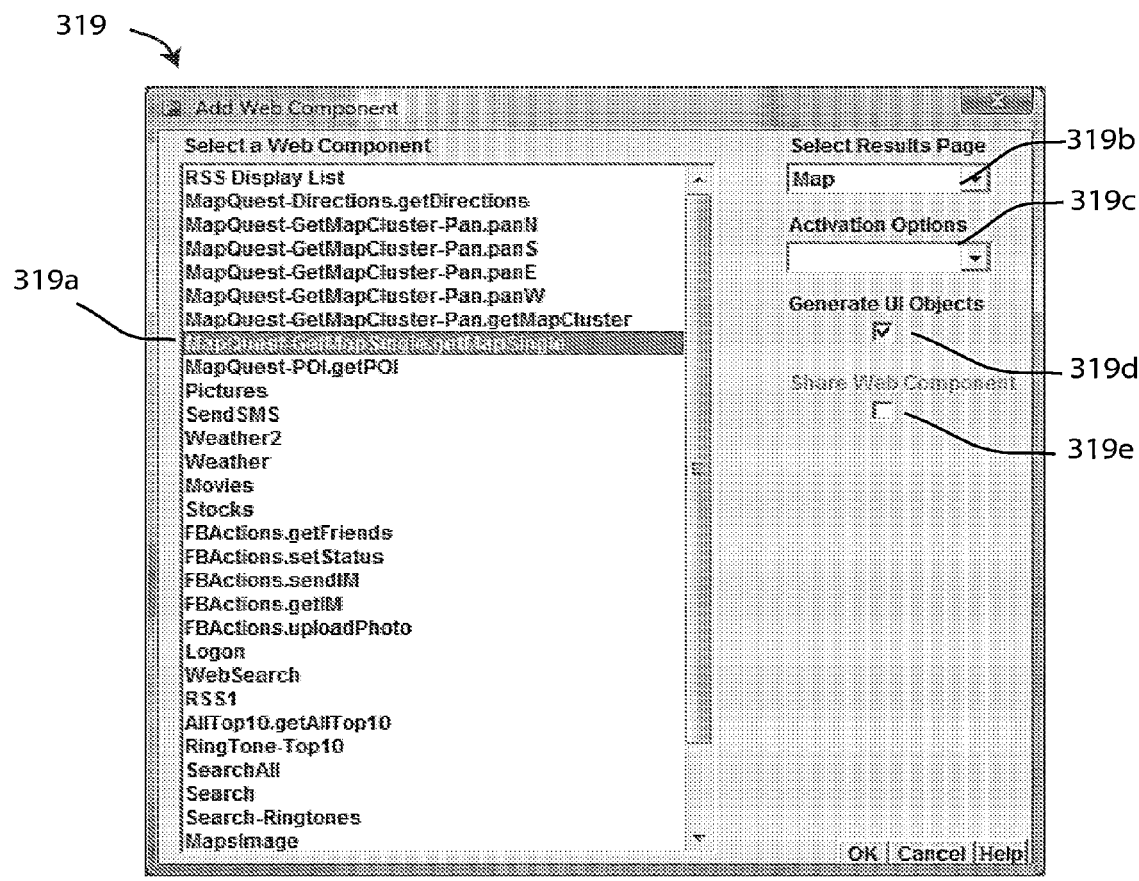
FIG. 3F illustrates one embodiment of a pop-up menu for adding web components.

Web Component and Web Services Operations 309e1 includes web components that may be added, edited or removed from a selected object. Since multiple web components can be added to the same object, any combination of mash-ups of 3rd party web services is possible. When the "Add" button of Web Component and Web Services Operations 309e1 is selected, a pop-up menu 319, as shown in FIG. 3F, appears on publisher interface 300. Pop-up menu 319 includes, but is not limited to, the options of: Select a Web Component 319a; Select Results Page 319b; Activation Options 319c; Generate UI Objects 319d; and Share Web Component 319e.

The Select a Web Component 319a portion presents a list of web components. As discussed herein, the web components are registered and are obtained from web component registry 220.

Select Results Page 319b is used to have the input and output on different pages—that is, when the Results page is different from Input page. The default selected results page is either the current page, or, if there are both inputs and outputs, it will be set provisionally to the next page in the current page order, if one exists.

Activation Options 319c include, if there are no Input UI Objects, a choice to either "Preload" the web component, similar to how dynamic binding, or have the web component executed when the "Results" page is viewed by the consumer.

Generate UI Objects 319c, if selected, will automatically generate the UI objects. If not selected, then the author will bind the Web Component Inputs and Results to previously created UI Objects.

Share Web Component 319e is available and will become selected under the following conditions: 1) Web Component is Selected which already has been used by the current Application; or 2) the current Input page is also a "Result" page for that Web component. This permits the user of device 130, after viewing the results, to extend the Web Component allowing the user to make additional queries against the same Web Component. Examples of this include, but are not limited to, interactive panning and zooming for a Mapping Application, or additional and or refined searches for a Search Application.

Dynamic Binding permits the binding of real time data, that could either reside in a 3rd party server-side data base, or in the database maintained by Feed Collector 1010 for aggregating live RSS feeds, as described subsequently with reference to FIG. 10.

Referring again to FIG. 3E, Attributes Exposed list 309e2 are the attributes available for the selected object that can be defined in real time through dynamic binding.

Panel 309e3 exposes all the fields and tables associated with registered server-side data bases. In one embodiment, the user would select an attribute from the "Attributes Exposed List" and then select a data base, table and field to define the real time binding process. The final step is to define the record. If the Feed Collector data base is selected, for example, then the RSS "Channel Name" and the "Channel Feed" drop down menus will be available for symbolically selected the record. For other data bases the RSS "Channel Name" and the "Channel Feed" drop down menus are replaced by a "Record ID" text field.

Default Attribute Value 309e4 indicates the currently defined value for the selected attribute. It will be overridden in real time based on the dynamic linkage setting.

Database Name 309e5 indicates which server side data base is currently selected.

Table Name 309e6 indicates which table of the server side data base is currently selected.

Field Name 309e7, indicates which field form the selected table of the server side data base is currently selected.

Channel Name 309e8 indicates a list of all the RSS feeds currently supported by the Feed Collector. This may be replaced by "Record ID" if a data base other than the Feed Collector 1010 is selected.

Channel Feed 309e9 indicates the particular RSS feed for the selected RSS Channel. Feed Collector 1010 may maintain multiple feeds for each RSS channel.

Operation 309e10, as a default operation, replaces the default attribute value with the real time value. In other embodiments this operation could be append, add, subtract, multiply or divide.

Select Link 309e11 a button that, when pressed, creates the dynamic binding. Touching the "Select Link" will cause the current data base selections to begin the blink is some manner, and the "Select Link" will change to "Create Link". The user could still change the data base and attribute choices. Touching the "Create Link" will set the "Link Set" checkbox and the "Create Link" will be replaced by "Delete Link" if the user wishes to subsequently remove the link. When the application is saved, the current active links are used to create the SPDL.

Link Set checkbox 309e12 indicates that a link is currently active.

Figures 4A, 4B:
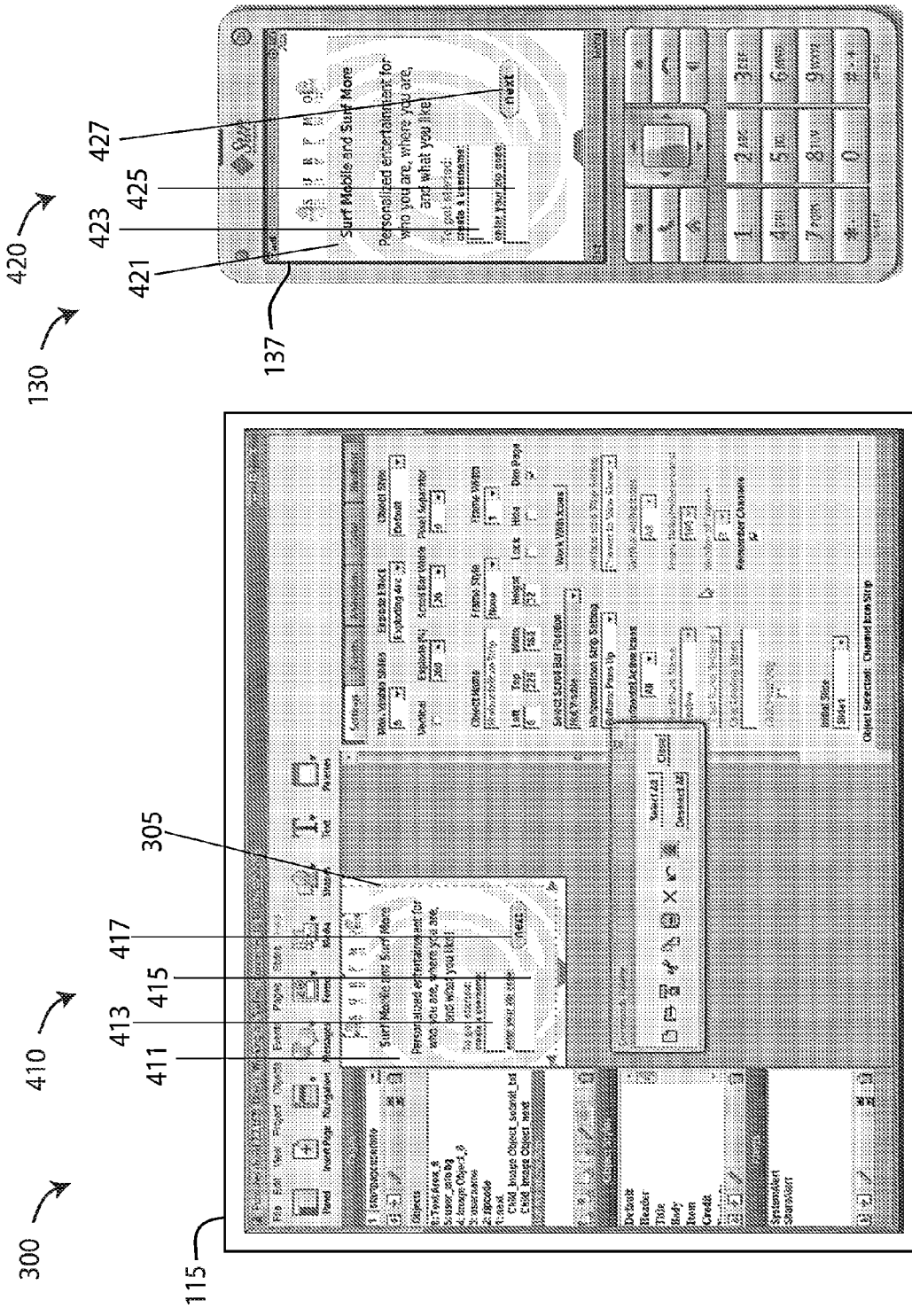
FIG. 4A shows a publisher interface having a layout on a canvas.
FIG. 4B shows a device having the resulting layout on a device screen.

An example of the design of a display is shown in FIGS. 4A and 4B according the system 100, where FIG. 4A shows publisher interface 300 having a layout 410 on canvas 305, and FIG. 4B shows a device 130 having the resulting layout 420 on screen 137. Thus, for example, authoring platform 110 is used to design layout 410. Authoring platform 110 then generates an Application and a Player specific to device 130 of FIG. 4B. The Application and Player are thus used by device 130 to produce layout 420 on screen 137.

As illustrated in FIG. 4A, a user has placed the following on canvas 305 to generate layout 410: text and background designs 411, a first text input box 413, a second text input box 415, and a button 417. As an example which is not meant to limit the scope of the present invention, layout 410 is screen prompts a user to enter a user name in box 413 and a password in box 415, and enter the information by clicking on button 417.

In one embodiment, all UI objects are initially rendered as Java objects on canvas 305. When the Application is saved, the UI objects are transformed into the PDL, as described subsequently.

Thus, for example, layout 410 may be produced by the user of authoring platform 110 selecting and placing a first Text Field as box 413 then using the Resource Inspector 309 portion of interface 300 to define its attributes.

Device User Experience

Systems 100 and 200 provide the ability for a very large number of different types of user experiences. Some of these are a direct result of the ability of authoring platform 110 to bind UI objects to components of web services. The following description is illustrative of some of the many types of experiences of using a device 130 as part of system 100 or 200.

Device 130 may have a one or more of a very powerful and broad set of extensible navigation objects, as well as object- and pointer-navigation options to make it easy to provide a small mobile device screen 137 with content and to navigate easily among page views, between Applications, or within objects in a single page view of an Application.

Navigation objects include various types of launch strips, various intelligent and user-friendly text fields and scrolling text boxes, powerful graphical complex lists, as well as Desktop-level business forms. In fact, every type of object can be used for navigation by assigning a navigation event to it. The authoring tool offers a list of navigation object templates, which then can be modified in numerous ways.

Launch Strips and Graphical List Templates Launch Strips

Launch strips may be designed by the user of authoring platform 110 with almost no restrictions. They can be stationary or appear on command from any edge of the device, their size, style, audio feedback, and animations can be freely defined to create highly compelling experiences.

Figure 5:
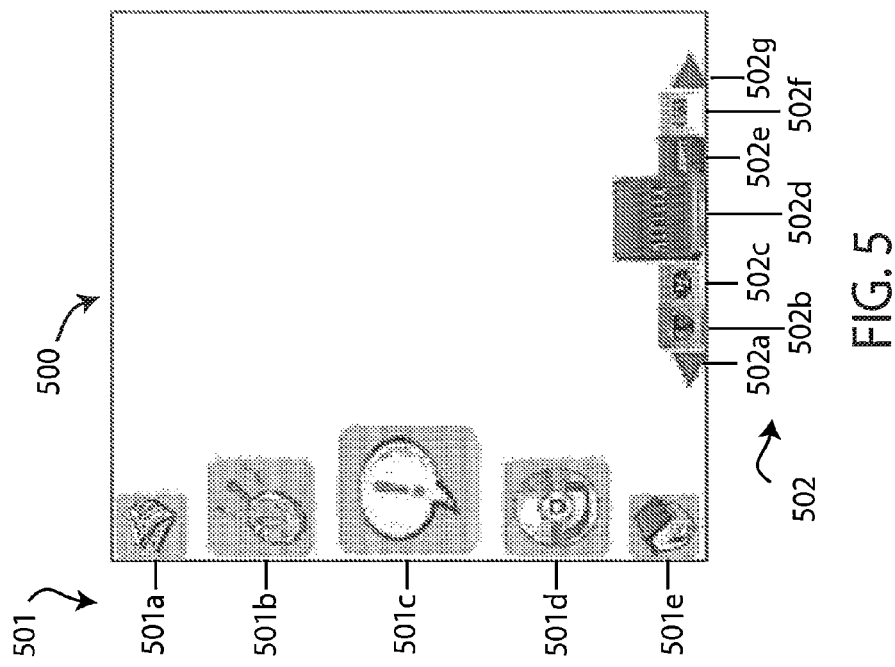
FIG. 5 shows a display of launch strips.

FIG. 5 shows a display 500 of launch strips which may be on displayed canvas 305 or on screen 137 of device 130 having the proper Player and Application. Display 501 includes a portal-type Launch Strip 501 and a channel-type Launch Strip 502, either one of which may be included for navigating the Application.

Launch Strip 501 includes UI objects 501a, 501b, 501c, 501d, and 501e that that becomes visible from the left edge of the display, when requested. UI objects 501a, 501b, 501c, 501d, and 501e are each associated, through resource inspector 309 with navigational instructions, including but not limited to navigating to a different Applications Page, or requesting web content. When the Applications Page, having been saved by authoring platform 110 and transferred to display 130, is executed on device 130, a user of the device may easily navigate the Application.

Launch Strip 502 includes UI objects 502b, 502c, 502d, and 503e that that becomes visible from the bottom of the display, when requested. UI objects 501a, 501b, 501c, 501d, and 501e are each associated, through resource inspector 309 with navigational instructions, including but not limited to navigating to a different Applications Page, or requesting web content. Launch Strip 502 also includes UI objects 502a and 503g, which include the graphic of arrows, and which provide access to additional navigation objects (not shown) when selected by a user of device 130. Launch strip 502 may also include sound effects for each channel when being selected, as well as popup bubble help.

Figures 6A, 6B, 6C:
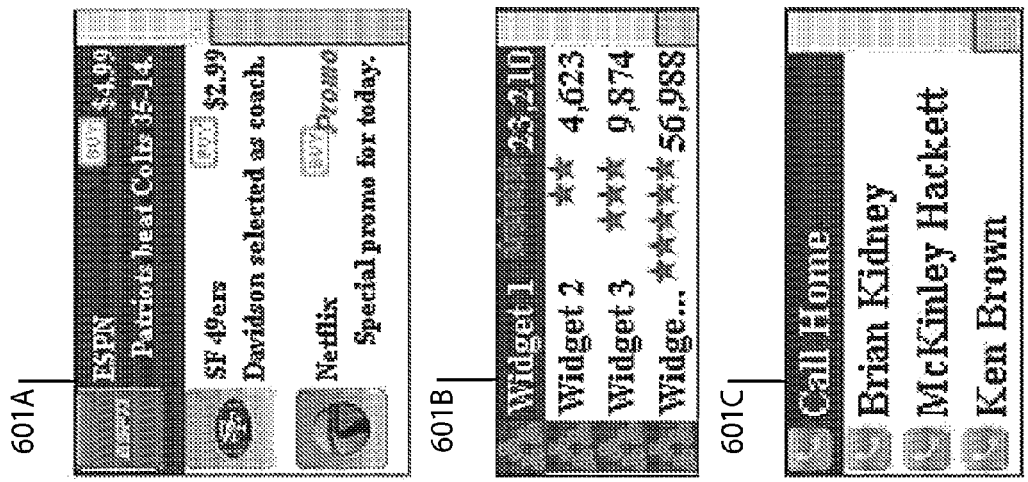
FIG. 6A is a display of a Channel Selection List.
FIG. 6B is a display of a Widget Selection List.
FIG. 6C is a display of a Phone List.

Additional navigational features are illustrated in FIG. 6A as a display of a Channel Selection List 601a, in FIG. 6B as a display of a Widget Selection List 601b, and in FIG. 6C as display of a Phone List 601c. Lists 601a, 601b, and 601c may be displayed on canvas 305 or on screen 137 of device 130 having the proper Player and Application. As illustrated, graphical lists 601a, 601b, and 601c may contain items with many possible text and image elements. Each element can be defined at authoring time and/or populated dynamically through one or more Web Service 250 or API. Assignable Navigation Events. All objects, and/or all elements within an object, can be assigned navigation events that can be extended to registered web services or APIs. For example, a Rolodex-type of navigation event can dynamically set the starting slide of the targeted page view (or the starting view of a targeted Application).

In the embodiment of FIGS. 6A, 6B, and 6C, each list 601a, 601b, and 601c has several individual entries that are each linked to specific actions. Thus Channel Selection List 601a shows three objects, each dynamically linked to a web service (ESPN, SF 49ers, and Netflix) each providing a link to purchase or obtain items from the Internet. Widget Selection List 601b includes several objects presenting different widgets for selecting. Phone List 601c includes a list phone number objects of names that, when selected by a user of device 130 cause the number to be dialed Entries in Phone List 601c may be generated automatically from either the user's contact list that is resident on the device, or though a dynamic link to any of user's chosen server-side facilities such as Microsoft Outlook, Google Mail, etc. In one embodiment, Phone List 601c may be generated automatically using a web component assigned to the Application, which would automatically perform those functions.

In another embodiment, authoring platform 110 allows a navigation selection of objects with a Joy Stick and/or Cursor Keys in all 4 directions. When within a complex object the navigation system automatically adopts to the navigation needs for that object. For coordinate sensitive objects such as geographical information services (GIS) and location-based services (LBS) or virtual tours a soft cursor appears. For Lists, scrolling text areas and chats, Launch strips, and slide shows the navigation process permits intuitive selection of elements within the object. Scroll bars and elevators are optionally available for feedback. If the device has a pointing mechanism then scroll bars are active and simulate the desktop experience.

Personalization and Temporal Adoption

System 100 and 200 permit for the personalization of device 130 by a variety of means. Specifically, what is displayed on screen 137 may depend on either adoption or customization. Adoption refers to the selection of choices, navigation options, etc. are based on user usage patterns. Temporal adoption permits the skins, choices, layouts, content, widgets, etc. to be further influenced by location (for example home, work or traveling) and time of day (including season and day of week). Customization refers to user selectable skins, choices, layouts, dynamic content, widgets, etc. that are available either through a customization on the phone or one that is on the desktop but dynamically linked to the user's other internet connected devices.

To support many personalization functions there must be a convenient method for maintaining, both within a user's session, and between sessions, memory about various user choices and events. Both utilizing a persistent storage mechanism on the device, or a database for user profiles on a server, may be employed.

Figure 7:
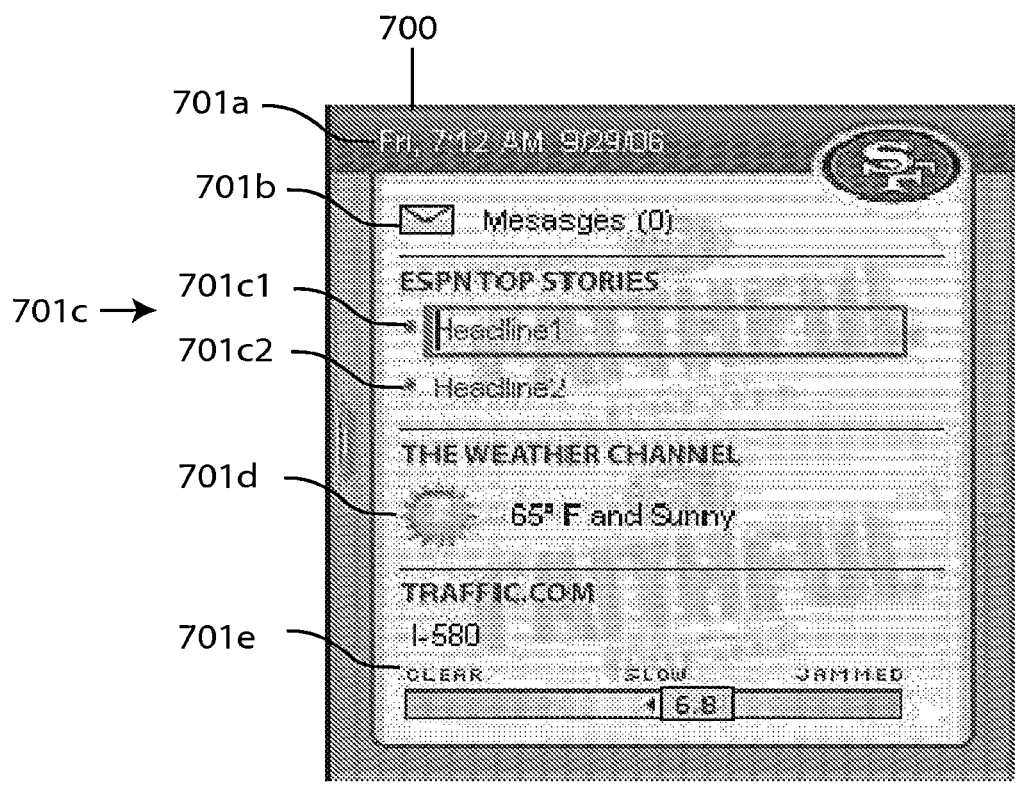
FIG. 7 shows a display of a mash-up.

FIG. 7 shows a display 700 of a mash-up which may be on displayed canvas 305 or on screen 137 of device 130 having the proper Player and Application. Display 700 includes several object 701 that have been dynamically bound, including an indication of time 701a, an indication of unread text messages 701b, an RSS news feed 701c (including 2 "ESPN Top Stories" 701c1 and 701c2), components 701d from two Web Services—a weather report ("The Weather Channel"), and a traffic report 701e ("TRAFFIC-.COM").

In assembling the information of display 700, device 130 is aware of the time and location of the device—in this example the display is for a workday when a user wakes. Device 130 has been customized so that on a work day morning the user wishes to receive the displayed information. Thus in the morning, any messages received overnight would be flagged, the user's favorite RSS sports feeds would be visible, today's weather forecast would be available, and the current traffic conditions between the user's home and office would be graphically depicted. User personalization settings may be maintained as persistent storage on device 130 when appropriate, or in a user profile which is maintained and updated in real-time in a server-side data base.

Push Capable Systems

In another embodiment system 100 or 200 is a push-capable system. As an example, of such systems, short codes may be applied to cereal boxes and beverage containers, and SMS text fields can be applied to promotional websites. In either case, a user of device 130 can text the short code or text field to an SMS server, which then serves the appropriate Application link back to device 130.

Figure 8:
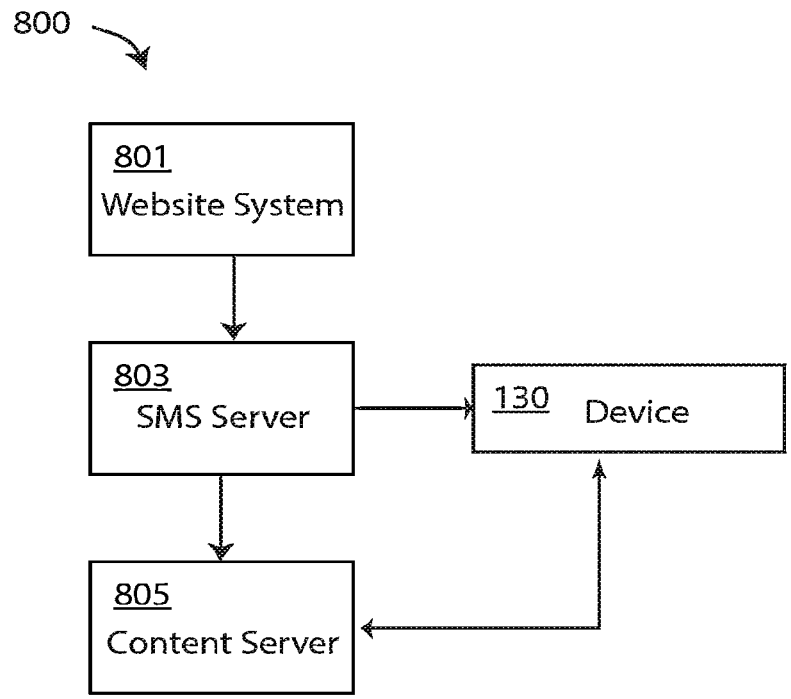
FIG. 8 is a schematic of an embodiment of a push capable system.

FIG. 8 is a schematic of an embodiment of a push enabled system 800. System 800 is generally similar to system 100 or 200. Device 130 is shown as part of a schematic of a push capable system 800 in FIG. 8. System 800 includes a website system 801 hosting a website 801, a server 803 and a content server 805. System 801 is connected to servers 803 and/or 805 through the Internet. Server 803 is generally similar to server 120, servers 805 is generally similar to server 140.

In one embodiment, a user sets up a weekly SMS update from website system 801. System 801 provides user information to server 803, which is an SMS server, when an update is ready for delivery. Server 803 provides device 130 with an SMS indication that the subscribed information is available and queries the user to see if they wish to receive the update. Website 801 also provides content server 805 with the content of the update. When a user of device 130 responds to the SMS query, the response is provided to content server 805, which provides device 130 with updates including the subscribed content.

In an alternative embodiment of system 800, server 803 broadcasts alerts to one or more devices 130, such as a logical group of devices. The user is notified in real-time of the pending alert, and can view and interact with the massage without interrupting the current Application.

Figure 9:
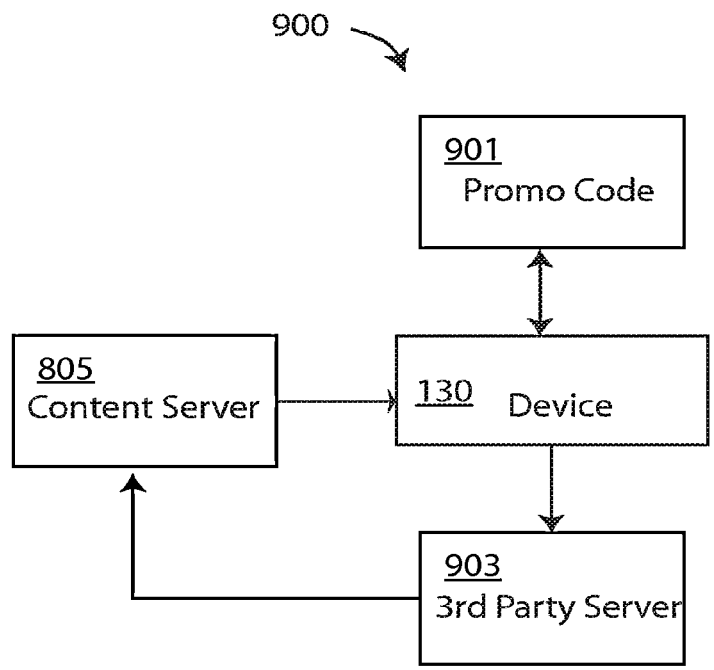
FIG. 9 is a schematic of an alternative embodiment of a push capable system.

FIG. 9 is a schematic of an alternative embodiment of a push enabled system 900. System 900 is generally similar to system 100, 200, or 800. In system 900 a user requests information using an SMS code, which is delivered to device 130. System 900 includes a promotional code 901, a third-party server 903, and content server 805. Server 803 is connected to servers 803 and/or 805 through the Internet, and is generally similar to server 120.

A promotional code 901 is provided to a user of device 130, for example and without limitation, on print media, such as on a cereal box. The use of device 130 sends the code server 903. Server 903 then notifies server 805 to provide certain information to device 130. Server 805 then provides device 130 with the requested information.

Device Routines

Device routines 114 may include, but are not limited to: an authoring tool SDK for custom code development including full set of Java APIs to make it easy to add extensions and functionality to mobile Applications and tie Applications to back-end databases through the content server 140; an expanding set of web services 250 available through the authoring tool SDK; a web services interface to SOAP/XML enabled web services; and an RSS/Atom and RDF feed collector 1010 and content gateway 1130.

Authoring Tool SDK for Custom Code Development Including Full Set of Java APIs

In one embodiment, authoring platform 110 SDK is compatible for working with various integrated development environments (IDE) and popular plug ins such as J2ME Polish. In one embodiment the SDK would be another plug in to these IDEs. A large and powerful set of APIs and interfaces are thus available through the SDK to permit the seamless extension of any Application to back end business logic, web services, etc. These interfaces and APIs may also support listeners and player-side object operations.

There is a large set of listeners that expose both player-side events and dynamically linked server side data base events. Some examples of player side events are: player-side time based event, a page entry event, player-side user interactions and player-side object status. Examples of server-side data base events are when a particular set of linked data base field values change, or some filed value exceeds a certain limit, etc.

A superset of all authoring tool functionality is available through APIs for layer-side object operations. These include, but are not limited to: page view level APIs for inserting, replacing, and or modifying any page object; Object Level APIs for modifying any attribute of existing objects, adding definitions to attributes, and adding, hiding or replacing any object.

Authoring Tool SDK Available Web Services

The APIs permit, without limit, respond, with or without relying on back-end business logic, that is, logic that what an enterprise has developed for their business, to any player-side event or server-side dynamically linked data-base, incorporating any open 3rd party web service(s) into the response.

RSS/Atom and RDF Feed Conversion Web Service

Figure 10:
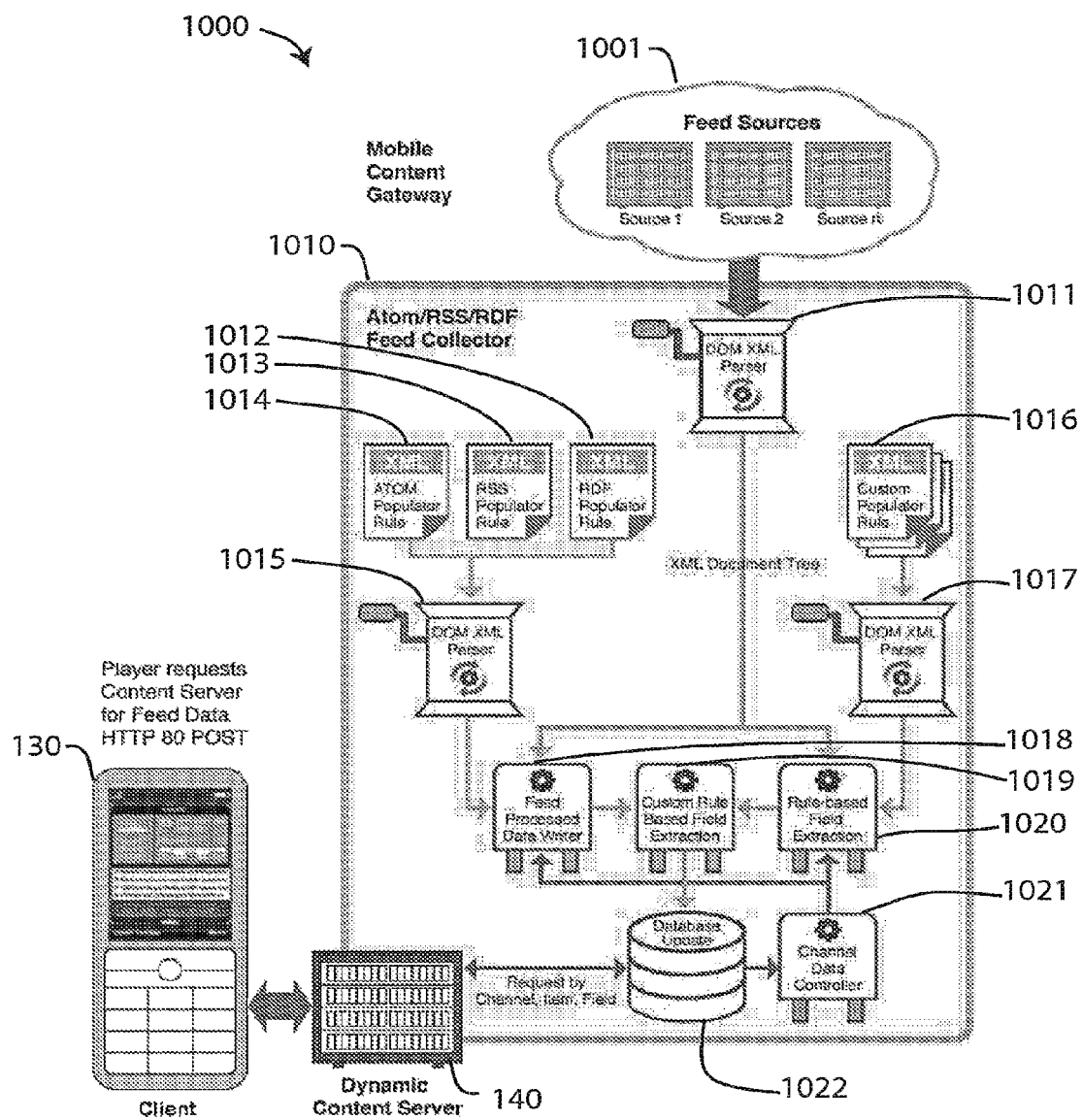
FIG. 10 is a schematic of one embodiment of a feed collector.

FIG. 10 is a schematic of one embodiment a system 1000 having a feed collector 1010. System 1000 is generally similar to system 100, 200, 800, or 900. Feed collector 1010 is a server side component of system 100 that collects RSS, ATOM and RDF format feeds from various sources 1001 and aggregates them into a database 1022 for use by the Applications built using authoring platform 110.

Feed collector 1010 is a standard XML DOM data extraction process, and includes Atom Populator Rule 1012, RSS Populator Rule 1013, RDF Populator Rule 1014, and Custom Populator Rule 1016, DOM XML Parsers 1011, 1015, and 1017, Feed Processed Data Writer 1018, Custom Rule Based Field Extraction 1019, Rule-based Field Extraction 1020, Channel Data Controller 1021, and Database 1022.

The feed collector is primarily driven by two sets of parameters: one is the database schema (written as SQL DDL) which defines the tables in the database, as well as parameters for each of the feeds to be examined. The other is the feed collection rules, written in XML, which can be used to customize the information that is extracted from the feeds. Each of the feeds is collected at intervals specified by the feed parameter set in the SQL DDL.

Feed collector 1010 accepts information from ATOM, RDF or RSS feed sources 1001. Using a rules-based populator, any of these feeds can be logically parsed, with any type of data extraction methodology, either by using supplied rules, or by the author defining their own custom extraction rule. The rules are used by the parser to parse from the feed sources, and the custom rule base field extraction replaces the default rules and assembles the parsed information into the database In particular, Atom Populator Rule 1012, RSS Populator Rule 1013, RDF Populator Rule 1014, Custom Populator Rule 1016, and DOM XML Parsers 1011, 1015, and 1017 are parse information from the feeds 1001, and Feed Processed Data Writer 1018, Custom Rule Based Field Extraction 1019, Rule-based Field Extraction 1020, and Channel Data Controller 1021, supply the content of the feeds in Database 1022, which is accessible through content server 140.

Figure 11:
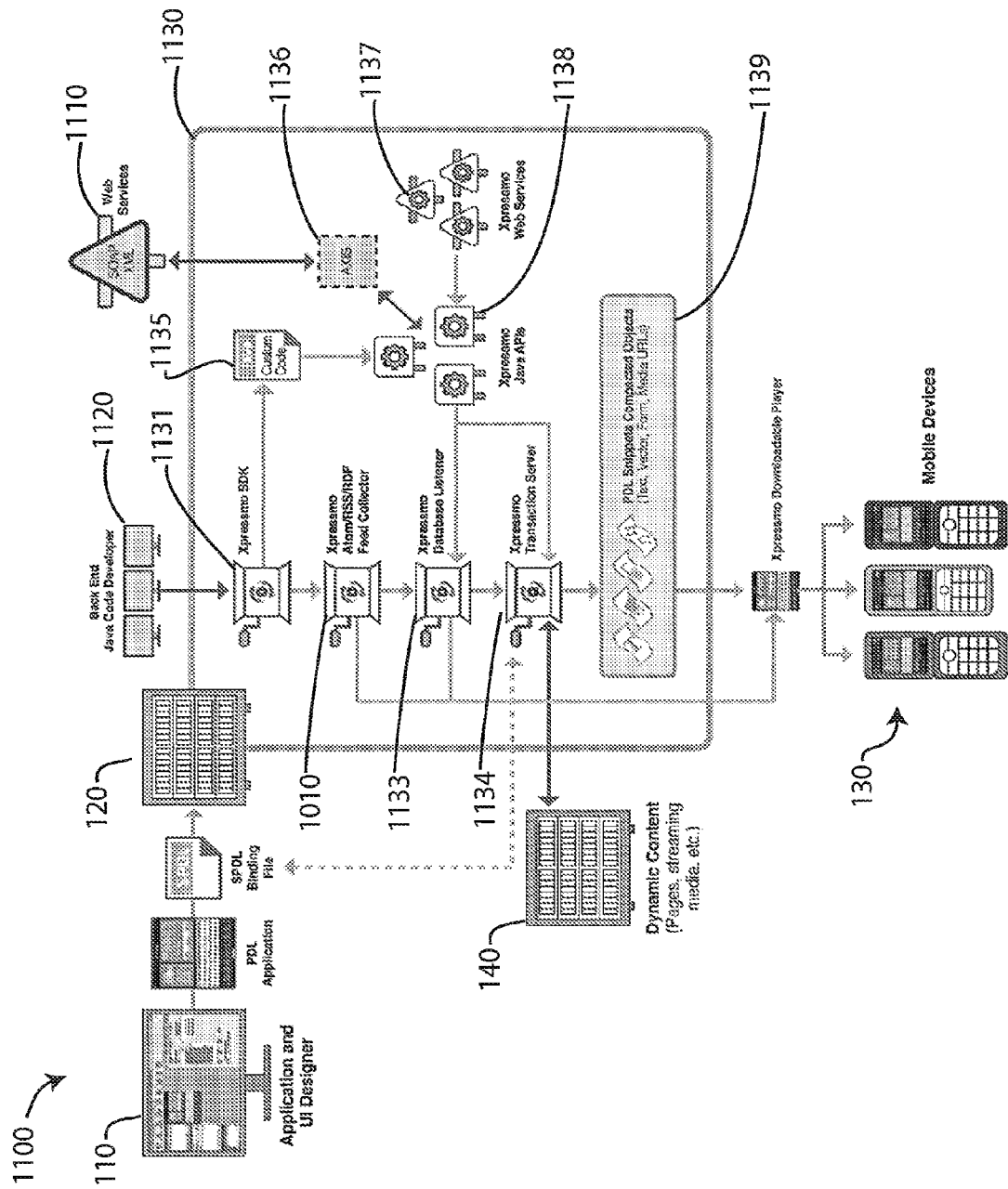
FIG. 11 is a schematic of an embodiment of a Mobile Content Gateway.

FIG. 11 is a schematic of an embodiment of a system 1100 having a Mobile Content Gateway 1130. System 1100 is generally similar to system 100, 200, 800, 900, or 1000. System 1100 includes an SDK 1131, feed collector 1010, database listener 1133, transaction server 1134, custom code 1135 generated from the SDK, Java APIs, Web Services 1137, and PDL snippets compacted objects 1139. System 1100 accepts input from Back End Java Code Developer 1120 and SOAP XML from Web Services 1110, and provides dynamic content to server 140 and Players to devices 130.

In one embodiment authoring platform 110 produces a Server-side PDL (SPDL) at authoring time. The SPDL resides in server 120 and provides a logical link between the Application's UI attributes and dynamic content in database 1022. When a user of device 130 requests dynamic information, server 120 uses the SPDL to determine the link required to access the requested content.

In another embodiment Web Services 1137 interface directly with 3rd party Web Services 1110, using SOAP, REST, JAVA, JavaScript, or any other interface for dynamically updating the attributes of the Application's UI objects.

XSP Web Pages as a Web Service

In one embodiment, a PDL for a page is embedded within an HTML shell, forming one XSP page. The process of forming XSP includes compressing the description of the page and then embedding the page within an HTML shell.

In another embodiment, a PDL, which contains many individual page definitions, is split into separate library objects on the server, so that each page can to presented as a PDL as part of a Web Service.

Prior to compression the code has already been transformed so that there are no dependencies on the original programming language (Java), and The code and data have been reduced by 4 to 10 times.

Compression has two distinct phases. The first takes advantage of how the primitive representations had been assembled, while the second utilizes standard LZ encoding.

The final result is an overall reduction of 40 to 100 times the original size as represented by Java serialized objects.

One embodiment for compacting data that may be used is described in Rempell. In that patent the compressed data is described as being a database. The terminology used here is a PDL, that is the "internal database" of Rempell is equivalent to the PDL of the present Application.

In Rempell, a process for compacting a "database" (that is, generating a compact PDL) is described, wherein data objects, including but not limited to, multi media objects such as colors, fonts, images, sound clips, URLs, threads, and video, including multi level animation, transformation, and time line are compacted. As an extension to Rempell in all cases these objects are reduced and transformed to Boolean, integer and string arrays.

The compression technique involves storing data in the smallest arrays necessary to compactly store web page information. The technique also includes an advanced form of delta compression that reduces integers so that they can be stored in a single byte, a as high water marks.

Thus, for example, the high water mark for different types of data comprising specific web site settings are stored in a header record as Boolean and integer variables and URL and color objects. Data that defines web page, paragraph, text button, and image style and text button, image and paragraph high watermark settings can be stored in one-dimensional arrays as Boolean, integer and string variables and URL, font, image or thread objects at. The URL, color, font, image and thread objects can also be created as required Data that defines text button, image, paragraph, or other parent objects and paragraph line high watermark settings can be stored in two-dimensional arrays (by web page and by object number) as Boolean, integer, string, floating point variables and URLs. Again, the URL, color, font, image, audio clip, video clip, text area and thread objects can also be created as required. Data that defines a paragraph line and paragraph line segment high watermarks can be stored in three-dimensional arrays (by web page, by paragraph number, and by line number) as Boolean, integer or string variables. Again, the URL, color or font objects can be created as required. Data that defines a paragraph line segment can be stored into four-dimensional arrays (by web page, by paragraph number, by line number and by line number segment) as Boolean, integer or string variables or URL, color and font objects.

As a data field is added, changed or deleted, a determination is made at on whether a value for a given high watermark needs to be changed. If so, it is updated. As a specific method in the build engine is called, a determination is made on whether a feature flag needs to be set. For example, if a particular JAVA method is called, which requires an instance of a certain JAVA Class to be executed by the run time engine, then that JAVA Class is flagged, as well as any supporting methods, variables and/or object definitions.

In one implementation, the header record, the style record, the web page record, and the object records, are carefully defined in a specific order, written in that order, and explicitly cast by object type when read by the run time engine. Exception handling can be implemented to recover from any errors. This helps assure that data integrity is maintained throughout the build and run time processes.

Also described in Rempell is the "run generation process." This is equivalent generating a Player in the present application. This process starts when the build process detects that the user is finished defining the web site (user has saved the web site and invokes the run generation process), and concludes with the actual uploading of all the necessary web site run time files to the user's server.

In one embodiment, the PDL includes a first record, a "Header" record, which contains can include the following information:

1: A file format version number, used for upgrading database in future releases.
2: The default screen resolution, in virtual pixels, for both the screen width and height. This is usually set to the web designer's screen resolution, unless overwritten by the user.
3: Whether the Application is a web site.
4: Virtual web page size settings. A calculation is performed by the build engine method, in order to calculate what the maximum web page length is, after reformatting all paragraphs on all internal web pages, based on the default screen resolution.
5: Web page and styles high watermarks.
6: The Websitename.

As new web pages or new objects are created by the user, or as text is added to or deleted from a paragraph, or as new styles are created or deleted, appropriate high watermarks are set, in order to show the current number of each of these entities. Thus, the values for the number of active web pages and the number of text button, image, paragraph or other styles are written as high watermarks in the header. The high watermarks for the number of text button, image, paragraph or other objects that exist for each web page, the number of lines for each paragraph object, and the number of line segments for each paragraph line are written within the body of the PDL, and used as settings for each of the loops in the four-dimensional data structure. Because no structural limits are set on the number of web pages, objects per web page, styles, or paragraph size, these high watermarks greatly reduce the external database file size, and the time it takes for the run time engine to process the data stored in its database.

The settings for all paragraph, text button and image styles are then written as a style record based on their high watermark. This data includes Boolean and integer variables, and font and color objects, written as a one-dimensional array, based on the high watermark values for the number of styles that exist.

The body of the PDL is then written. All Boolean values are written inside a four-dimensional loop. The outside loop contains the Boolean values used to define web pages (i.e. a one-dimensional array definition) as well as the high watermarks for the number of text button, image, paragraph or other objects per web page, with the loop set at the high watermark which defines the number of existing web pages for this web site structure. The second level consists of three or more two dimensional loops with the loops set to the high watermarks defining the actual number of text button, image, and paragraph or other objects that appear on any given web page and contains the values used to define web page objects ((i.e. a two-dimensional array definition; web page number by object number). Included within the loop for paragraph objects are the high watermarks for the number of lines for each paragraph object. The third loop is set by the high watermark defining the actual number of paragraph lines that for all paragraphs on any web page and contains the values used to define paragraph lines (i.e. a three-dimensional array definition; web page number by object number by paragraph line.) Included within the loop for paragraph lines are the high watermarks for the number of line segments for each paragraph line. The inner most loop is set by the high watermarks defining the number of line segments per paragraph line and contains the values used to define paragraph line segments (i.e. a four-dimensional array definition; web page number by object number by paragraph line by paragraph line segment).

All integer values are written inside a four-dimensional loop. Their four loops are controlled by the same high watermark settings as used for the Boolean records, and they describe the same logical entities.

Multimedia objects are written inside a two-dimensional loop. They include URL, color, and font objects, and can include other types of objects. A URL object is the encoded form of a URL Address, used by a web browser or a JAVA method to access files and web addresses. All multimedia objects must be serialized before they can be written. This means that the objects are converted into a common external definition format that can be understood by the appropriate deserialization technique when they are read back in and cast into their original object structure. The outside loop contains web page related objects, and the inner loop contains image, text button, paragraph, etc. related URL, color, and font objects. The outer loop is defined by the web page high watermark and the inner loops by the high watermarks for the actual number of text button, image, paragraph or other objects on a web page.

String records are written inside a four-dimensional loop. The outer loop may be empty. The second loop can include the string values for text button objects, audio and video filenames, and audio and video channel names. The third loop contains values for paragraph line related data, and the innermost loop contains the values for paragraph line segment definitions. The string records are controlled by the same high watermarks as those used for Boolean and integer records. String records are stored utilizing an appropriate field delimiter technology. In one implementation, a UTF encoding technology that is supported by JAVA is utilized.

Single and double floating-point, and long integer records are written inside a two-dimensional loop. The outer loop may be empty. The inner loop contains mathematical values required for certain animations and image processing algorithms. The single and double floating-point, and long integer records are controlled by the same high watermarks as those used for Boolean and integer records.

In one embodiment, a versionizing program analyzes the feature flags, and only those variable definitions, defined in the "Main" object class, relating to the object classes and methods that will be executed at run time, are extracted. All references to object classes that will be called at run time are extracted, creating the source code for the run engine "Main" object class that is ready for compilation.

All external image, video and audio files are resolved. The external references can be copied to designated directories, either on the user's local disk or file server. The file Pathnames can be changed to reflect these new locations. During the installation of the build tools, the necessary class libraries are either installed on the local system or made available on the server where the build tools can be optionally located. The necessary environmental variables are set to permit normal access to the required class libraries.

The customized run engine and a library of the referenced run time classes are compiled and converted into byte code. Finally, the run time engine for the web site is created. The required set of class objects required at run time is flagged for inclusion into the CAB/JAR file.

Next, an HTML Shell File (HSF) is constructed. The first step of this process is to determine whether the dynamic web page and object resizing is desired by testing the Application setting. If the Application was a web page, and thus requiring dynamic web page and object resizing, virtual screen resolution settings are placed in an appropriate HTML compliant string. If the Application is a banner or other customized Application, the absolute values for the run time object (applet size) height and width are placed in an appropriate HTML compliant string as absolute width and height values.

An analysis is made for the background definition for the first internal web page. If a background pattern is defined, an appropriate HTML compliant string for setting the HTML "background" to the same background image is generated. If the first web page definition is a color instead, then the RGB values from those colors are converted to hexadecimal and an appropriate HTML compliant String is generated setting the "bgcolor" to the required hexadecimal value. This process synchronizes the web page background with the background that will be drawn by the web browser when it first interprets the HSF.

Thereafter, a JAVA method generates HTML and JavaScript compliant strings, that when executed by a web browser, generate additional sets of HTML and JavaScript compliant strings that are again executed by the web browser. More specifically, if the Application required dynamic web page and object resizing then JavaScript and HTML compliant strings are generated so that, when interpreted by the web browser at the time the HTML Shell File is initialized, the screen resolution sensing JAVA applet (SRS) will be executed. JavaScript code is generated in order to enable JavaScript to SRS applet communication. In one implementation, the code is generated by performing the following functions:

1: Determine the current web browser type.
2: Load the SRS from either a JAR or CAB File, based on web browser type.
3: Enter a timing loop, interrogating when the SRS is loaded.
4: When the SRS returns an "available" status, interrogate the SRS, which will return the current screen and window's actual height and width.
5: Convert the virtual screen resolution settings into appropriate absolute screen width and height values.

Strings defining additional JavaScript code are generated that perform the following steps at the time the HSF is initialized by the web browser:

1: Generate HTML compliant strings that set the run time engine's applet size to the appropriate values.
2: Generate an HTML complaint string that contains a "param" definition for linking the run time engine to the PDL.
3: Generate an HTML complaint string, dependent upon the type of web browser, which causes the current web browser to load either the JAR or the CAB File(s).
4: Generate JavaScript Code compliant strings that create and dynamically write the applet size defining HTML strings utilizing the JavaScript "document.write" function. This dynamically created code causes the web browser to execute the run time engine, in the correctly sized window, from the correct JAR or CAB file, and linked to the external database.

The writing out the above-generated HTML and JavaScript compliant strings creates the HSF. The necessary security policy permissions are asserted, and a "Websitename".html file is created.

In one embodiment, the processes for creating the CAB and JAR Files is as follows. The image objects, if any, which were defined on the first internal web page are analyzed. If they are set to draw immediately upon the loading of the first web page, then they are flagged for compression and inclusion in the CAB and JAR Files. The feature flags are analyzed to determine which JAVA classes have been compiled. These class files are flagged for compression and inclusion in the library CAB and JAR Files. Strings that are BAT compliant definitions are created that will, when executed in DOS, create compressed CAB and JAR Files. These CAB and JAR Files contain the compressed versions of all necessary JAVA class files, image files, the "Websitename".class, customized run time engine file, and the "Websitename".dta database file. In one implementation of the invention, two BAT files are created. The first, when executed, will create a CAB/JAR file with the "Websitename".dta database file and the customized "main" run time engine, excluding all the image and button object animation, transformation, and image processing code. The second BAT file, when executed, will create a CAB/JAR file with all the library of all the referenced image and button object animation, transformation, and image processing code.

The necessary security policy permissions for file creation are then asserted, and "Websitename".bat and "Websitenamelib".bat files are written. The "Websitename".bat and "Websitename".bat files are then executed under DOS, creating compressed "Websitename".cab and "Websitenamelib".cab files and compressed "Websitename" jar and "Websitenamelib" jar files. The HTML Shell File and the JAR and CAB files are then, either as an automatic process, or manually, uploaded to the user's web site. This completes the production of an XSP page that may be accessed through a web browser.

Displaying Content on a Device
Decompression Management

Authoring platform 110 uses compaction to transform the code and data in an intelligent way while preserving all of the original classes, methods and attributes. This requires both an intelligent server engine and client (handset) Player, both of which fully understand what the data means and how it will be used.

The compaction technology described above includes transformation algorithms that deconstruct the logic and data into their most primitive representations, and then reassembles them in a way that can be optimally digested by further compression processing. This reassembled set of primitive representations defines the PDL of authoring platform 110.

Prior to compression the code has already been transformed so that there are no dependencies on the original programming language (Java). The data is then compressed by first taking advantage of how the primitive representations had been assembled, and then by utilizing standard LZ encoding. The final result is an overall reduction of 40 to 100 times the original size as represented by Java serialized objects.

The Player, when preparing a page view for execution, decompresses and then regenerate the original objects, but this time in compliance with the programming APIs of device 130. Specifically, device 130 operates on compacted image pages, one at a time. The cache manager retrieves, decompresses, and reassembles the compacted page images into device objects, which are then interpreted by device 130 for display on screen 137.

Response Director

In one embodiment, system 100 includes a Response Director, which determines a user's handset, fetches the correct Application from different databases, and delivers a respective highly compressed Application in a PDL format over the air (OTA).

In one embodiment, the Response Director operates on a network connected computer to provide the correct Player to a given device based on the information the device sent to it. As an example, this may occur when a device user enters their phone number into some call-to-action web page. The response director is called and sends an SMS message to the device, which responds, beginning the recognition process.

Figure 12:
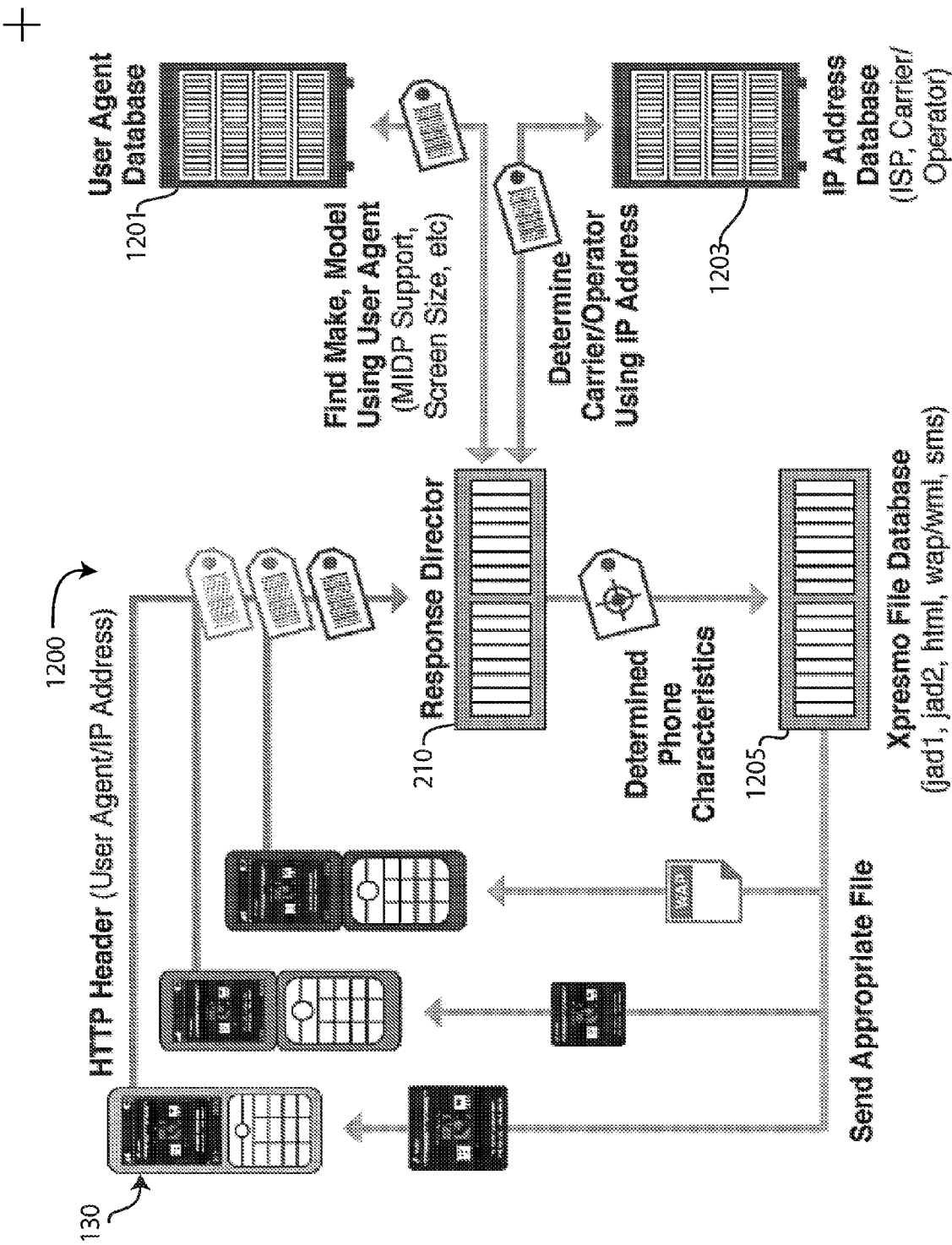
FIG. 12 is a schematic of one embodiment of a system that includes a response director, a user agent database, an IP address database, and a file database.

FIG. 12 illustrates one embodiment of a system 1200 that includes a response director 210, a user agent database 1201, an IP address database 1203, and a file database 1205. System 1200 is generally similar to system 100, 200, 800, 900, 1000, or 1100.

Databases 1201, 1203, and 1205 may reside on server 120, 210, or any computer system in communication with response director 210. System 1200, any mobile device can be serviced, and the most appropriate Application for the device will be delivered to the device, based on the characteristics of the device.

User agent database 1201 includes user agent information regarding individual devices 130 that are used to identify the operating system on the device. IP address database 1203 identifies the carrier/operator of each device 130. File database 1205 includes data files that may operate on each device 130.

The following is an illustrative example of the operation of response director 210. First, a device 1300 generates an SMS message, which automatically sends an http:// stream that includes handset information and its phone number to response director 210. Response director 210 then looks at a field in the http header (which includes the user agent and IP address) that identifies the web browser (i.e., the "User Agent"). The User Agent prompts a database lookup in user agent database 1201 which returns data including, but not limited to, make, model, attributes, MIDP 1.0 MIDP 2.0, WAP and distinguishes the same models from different countries. A lookup of the IP address in IP address 1203 identifies the carrier/operator.

File database 1205 contains data types, which may include as jad1, jad2, html, wm1/wap2, or other data types, appropriate for each device 130. A list of available Applications are returned to a decision tree, which then returns, to device 130, the Application that is appropriate for the respective device. For each file type, there is an attributes list (e.g., streaming video, embedded video, streaming audio, etc.) to provide enough information to determine what to send to the handset.

Response director 210 generates or updates an html or jad file populating this text file with the necessary device and network dependent parameters, including the Application dependent parameters, and then generate, for example, a CAB or JAD file which contains the necessary Player for that device. For example, the jad file could contain the operator or device type or extended device-specific functions that the player would then become aware of.

If there is an Application that has a data type that device 130 cannot support, for example, video, response director 210 sends an alternative Application to the handset, for example one that has a slide show instead. If the device cannot support a slide show, an Application might have text and images and display a message that indicates it does not support video.

Another powerful feature of response director 210 is its exposed API from the decision tree that permits the overriding of the default output of the decision tree by solution providers. These solution providers are often licensees who want to further refine the fulfillment of Applications and Players to specific devices beyond what the default algorithms provide. Solution providers may be given a choice of Applications and then can decide to use the defaults or force other Applications.

Authoring platform 110 automatically scales Applications at publishing time to various form factors to reduce the amount of fragmentation among devices, and the Response Director serves the appropriately scaled version to the device. For example, a QVGA Application will automatically scale to the QCIF form factor. This is important because one of the most visible forms of fragmentation resides in the various form factors of wireless, and particularly mobile, devices, which range from 128×128, 176×208, 240×260, 220×220, and many other customized sizes in between.

Figure 13:
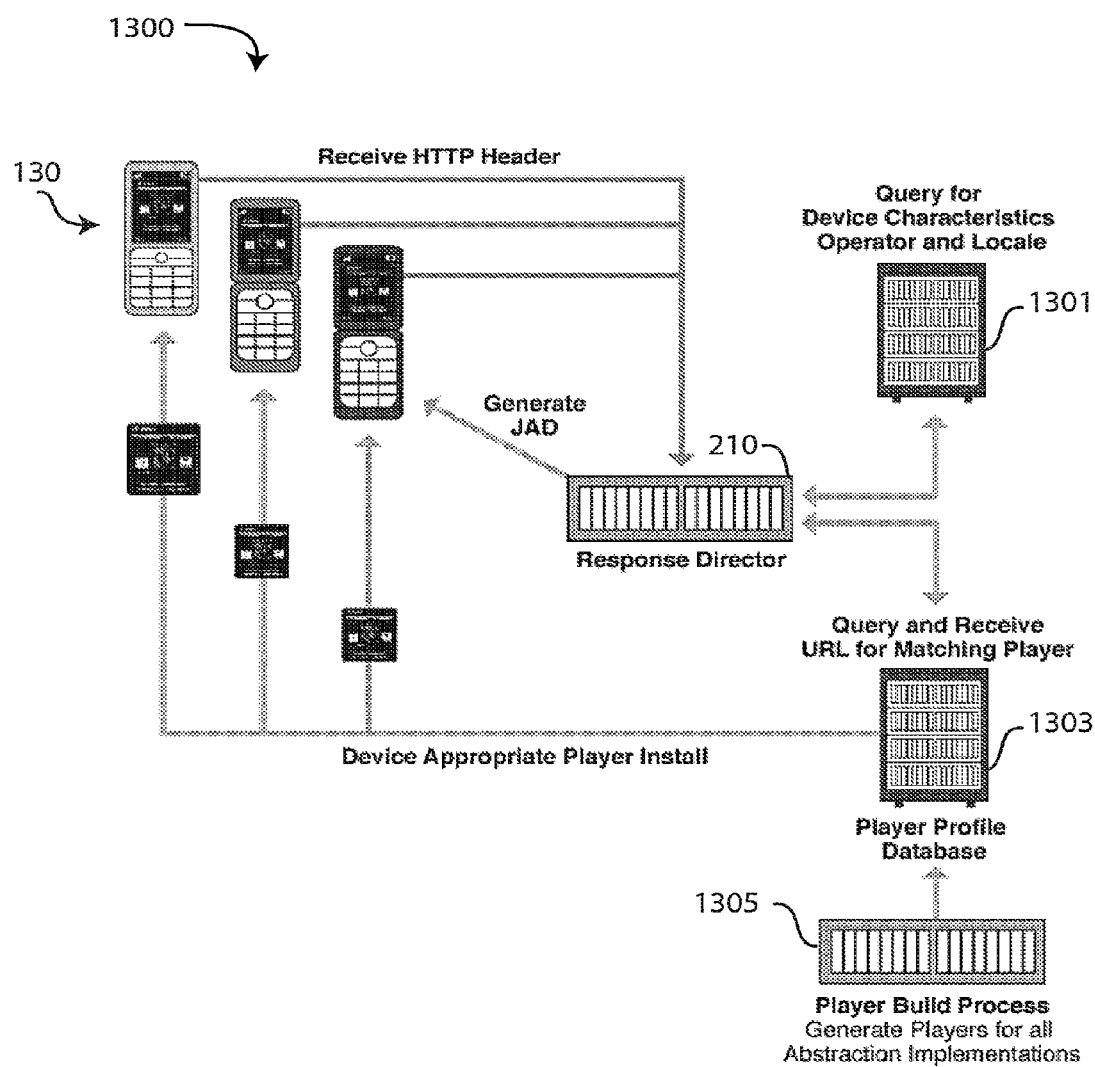
FIG. 13 is a schematic of another embodiment of a system that includes a response director, a user agent database, an IP address database, and a file database.

FIG. 13 is a schematic of an embodiment of a system 1300. System 1300 is generally similar to system 1200. System 1300 is an overview of the entire Player fulfillment process, starting with the generation of players during the player build process.

System 1300 includes response director 210, a device characteristics operator and local database 1301, a player profile database 1303 and a player build process 1305, which may be authoring platform 110.

As an example of system 1300, when response director 210 receives an SMS message from device 130, the response director identifies the device characteristics operator and locale from database 1301 and a Player URL from database 1303 and provides the appropriate Player to the device.

In another embodiment, Player P extend the power of response director 210 by adapting the Application to the resources and limitations of any particular device. Some of these areas of adaptation include the speed of the device's microprocessor, the presence of device resources such as cameras and touch screens. Another area of adaptation is directed to heap, record store and file system memory constraints. In one embodiment, the Player will automatically throttle down an animation to the frame rate that the device can handle so that the best possible user experience is preserved. Other extensions include device specific facilities such as location awareness, advanced touch screen interactions, push extensions, access to advanced phone facilities, and many others Memory Management In one embodiment, Player P includes a logical page virtual memory manager. This architecture requires no supporting hardware and works efficiently with constrained devices. All page view images, which could span multiple Applications, are placed in a table as highly compacted and compressed code. A typical page view will range from 500 bytes up to about 1,500 bytes. (See, for example, the Rempell patent) When rolled into the heap and instantiated this code increases to the more typical 50,000 up to 250,000 bytes. Additional alert pages may also be rolled into the heap and superimposed on the current page view. Any changes to any page currently downloaded are placed in a highly compact change vector for each page, and rolled out when the page is discarded. Note that whenever an Application is visited that had previously been placed in virtual memory the Server is interrogated to see if a more current version is available, and, if so, downloads it. This means that Application logic can be changed in real-time and the results immediately available to mobile devices.

To operate efficiently with the bandwidth constraints of mobile devices, authoring platform 110 may also utilize anticipatory streaming and multi-level caching. Anticipatory streaming includes multiple asynchronous threads and IO request queues. In this process, the current Application is scanned to determine if there is content that is likely to be required in as-yet untouched page views. Anticipatory streaming also looks for mapping Applications, where the user may zoom or pan next so that map content is retrieved prior to the user requesting it. For mapping applications, anticipatory streaming downloads a map whose size is greater than the map portal size on the device and centered within the portal. Any pan operation will anticipatory stream a section of the map to extend the view in the direction of the pan while, as a lower priority, bring down the next and prior zoom levels for this new geography. Zooming will always anticipatory stream the next zoom level up and down.

Multi-level caching determines the handset's heap through an API, and also looks at the record store to see how much memory is resident. This content is placed in record store and/or the file system, and may, if there is available heap, also place the content there as well. Multi-level caching permits the management of memory such that mobile systems best use limited memory resources. Multi-level caching is a memory management system with results similar to embedding, without the overhead of instantiating the content. In other words, with multi-level caching, handset users get an "embedded" performance without the embedded download. Note that when content is flagged as cacheable and is placed in persistent storage, a digital rights management (DRM) solution will be used.

One embodiment of each of the methods described herein is in the form of a computer program that executes on a processing system. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system. It should thus be appreciated that although the coding for programming devices has not be discussed in detail, the invention is not limited to a specific coding method. Furthermore, the invention is not limited to any one type of network architecture and method of encapsulation, and thus may be utilized in conjunction with one or a combination of other network architectures/protocols.

Reference throughout this specification to "one embodiment," "an embodiment," or "certain embodiments" means that a particular feature, structure or characteristic described in connection with the embodiment is included in at least one embodiment of the present invention. Thus, appearances of the phrases "in one embodiment," "in an embodiment," or "in certain embodiments" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Throughout this specification, the term "comprising" shall be synonymous with "including," "containing," or "characterized by," is inclusive or open-ended and does not exclude additional, unrecited elements or method steps. "Comprising" is a term of art which means that the named elements are essential, but other elements may be added and still form a construct within the scope of the statement. "Comprising" leaves open for the inclusion of unspecified ingredients even in major amounts.

Similarly, it should be appreciated that in the above description of exemplary embodiments, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment, and the invention may include any of the different combinations embodied herein. Thus, the following claims are hereby expressly incorporated into this Mode(s) for Carrying Out the Invention, with each claim standing on its own as a separate embodiment of this invention.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A system for generating code to provide content on a display of a device, said system comprising:
    computer memory storing a registry of:
        a) symbolic names required for evoking one or more web components each related to a set of inputs and outputs of a web service obtainable over a network, where the symbolic names are character strings that do not contain either a persistent address or pointer to an output value accessible to the web service, where each symbolic name has an associated data format class type corresponding to a subclass of User Interface (UI) objects that support the data format type of the symbolic name, and has a preferred UI object, and
        b) an address of the web service;
    an authoring tool configured to:
        define a (UI) object for presentation on the display, where said defined UI object corresponds to a web component included in said registry selected from a group consisting of an input of the web service and an output of the web service, where each defined UI object is either: 1) selected by a user of the authoring tool; or 2) automatically selected by the system as the preferred UI object corresponding to the symbolic name of the web component selected by the user of the authoring tool,
        access said computer memory to select the symbolic name corresponding to the web component of the defined UI object,
        associate the selected symbolic name with the defined UI object, where the selected symbolic name is only available to UI objects that support the defined data format associated with that symbolic name, and
        produce an Application including the selected symbolic name of the defined UI object, where said Application is a device-independent code; and
    a Player, where said Player is a device-dependent code, wherein, when the Application and Player are provided to the device and executed on the device, and when the user of the device provides one or more input values associated with an input symbolic name to an input of the defined UI object,
        1) the device provides the user provided one or more input values and corresponding input symbolic name to the web service,
        2) the web service utilizes the input symbolic name and the user provided one or more input values for generating one or more output values having an associated output symbolic name,
        3) said Player receives the output symbolic name and corresponding one or more output values and provides instructions for the display of the device to present an output value in the defined UI object.

2. The system of claim 1, where said registry includes definitions of input and output related to said web service.

3. The system of claim 1, where said web component is a text chat, a video chat, an image, a slideshow, a video, or an RSS feed.

4. The system of claim 1, where said UI object is an input field for a chat.

5. The system of claim 1, where said UI object is an input field for a web service.

6. The system of claim 1, where said UI object is an input field usable to obtain said web component, where said input field includes a text field, a scrolling text box, a check box, a drop down-menu, a list menu, or a submit button.

7. The system of claim 1, where said web component is an output of a web service, is the text provided by one or more simultaneous chat sessions, is the video of a video chat session, is a video, an image, a slideshow, an RSS display, or an advertisement.

8. The system of claim 1, where said authoring tool is further configured to:
    define a phone field or list; and
    generate code that, when executed on the device, allows a user to supply a phone number to said phone field or list.

9. The system of claim 1, where said authoring tool is further configured to:
    define a SMS field or list; and
    generate code that, when executed on the device, allows a user to supply an SMS address to said SMS field or list.

10. The system of claim 1, where said code includes three or more codes, where one of said three or more codes is device specific, and where two of said three or more codes is device independent.

11. The system of claim 1, where said code is provided over said network.

12. The system of claim 1, wherein said defined UI object corresponds to a widget.

13. The system of claim 1, where said Player is activated and runs in a web browser.

14. The system of claim 1, where said Player is a native program.

15. A method of displaying content on a display of a device having a Player, where said Player is a device-dependent code, said method comprising:

defining a user interface (UI) object for presentation on the display, where said UI object corresponds to a web component included in a registry of one or more web components selected from a group consisting of an input of a web service and an output of the web service, where each web component includes a plurality of symbolic names of inputs and outputs associated with each web service, and where the registry includes: a) symbolic names required for evoking one or more web components each related to a set of inputs and outputs of the web service obtainable over a network, where the symbolic names are character strings that do not contain either a persistent address or pointer to an output value accessible to the web service, and b) an address of the web service, and where each defined UI object is either: 1) selected by a user of an authoring tool; or 2) automatically selected by a system as a preferred UI object corresponding to a symbolic name of the web component selected by the user of the authoring tool;

selecting the symbolic name from said web component corresponding to the defined UI object, where the selected symbolic name has an associated data format class type corresponding to a subclass of UI objects that support the data format type of the symbolic name, and has the preferred UI object;

associating the selected symbolic name with the defined UI object; and producing an Application including the selected symbolic name of the defined UI object, where said Application is a device-independent code, wherein, when the Application and Player are provided to the device and executed on the device, and when the user of the device provides one or more input values associated with an input symbolic name to an input of the defined UI object, 1) the device provides the user provided one or more input values and corresponding input symbolic name to the web service,
2) the web service utilizes the input symbolic name and the user provided one or more input values for generating one or more output values having an associated output symbolic name,
3) said Player receives the output symbolic name and corresponding one or more output values and provides instructions for the display of the device to present an output value in the defined UI object.

16. The method of claim 15, where said registry includes definitions of input and output related to said web service.

17. The method of claim 15, where said web component is a text chat, a video chat, an image, a slideshow, a video, or an RSS feed.

18. The method of claim 15, where said UI object is an input field for a chat.

19. The method of claim 15, where said UI object is an input field for a web service.

20. The method of claim 15, where said UI object is an input field usable to obtain said web component, where said input field includes a text field, a scrolling text box, a check box, a drop down-menu, a list menu, or a submit button.

21. The method of claim 15, where said web component is an output of a web service, is the text provided by one or more simultaneous chat sessions, is the video of a video chat session, is a video, an image, a slideshow, an RSS display, or an advertisement.

22. The method of claim 15, further comprising:
defining a phone field or list; and
generating code that, when executed on the device, allows a user to supply a phone number to said phone field or list.

23. The method of claim 15, further comprising:
defining a SMS field or list; and
generating code that, when executed on the device, allows a user to supply an SMS address to said SMS field or list.

24. The method of claim 15, and such that said Player interprets dynamically received, device independent values of the web component defined in the Application.

25. The method of claim 15, further comprising:
providing said Application and Player over said network.

26. The method of claim 15, wherein said UI object corresponds to a widget.

27. The method of claim 15, where said Player is activated and runs in a web browser.

28. The method of claim 15, where said Player is a native program.

* * * * *